US007469272B2

(12) United States Patent
McKee et al.

(10) Patent No.: US 7,469,272 B2
(45) Date of Patent: Dec. 23, 2008

(54) SYSTEM AND METHOD UTILIZING TEST NOTIFICATIONS

(75) Inventors: Timothy P. McKee, Seattle, WA (US); Fabrice A. Debry, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 667 days.

(21) Appl. No.: 10/402,179

(22) Filed: Mar. 26, 2003

(65) Prior Publication Data

US 2004/0193688 A1 Sep. 30, 2004

(51) Int. Cl.
G06F 15/16 (2006.01)
(52) U.S. Cl. .................. 709/206; 709/207; 719/318
(58) Field of Classification Search ......... 709/206–207; 719/318
See application file for complete search history.

(56) References Cited

U.S. PATENT DOCUMENTS

| | | | | |
|---|---|---|---|---|
| 5,519,863 | A * | 5/1996 | Allen et al. | 719/318 |
| 5,764,985 | A * | 6/1998 | Smale | 719/328 |
| 6,195,795 | B1 * | 2/2001 | Block et al. | 717/101 |
| 6,453,311 | B1 * | 9/2002 | Powers, III | 707/2 |
| 6,549,916 | B1 * | 4/2003 | Sedlar | 707/200 |
| 6,618,716 | B1 | 9/2003 | Horvitz | |
| 6,816,878 | B1 * | 11/2004 | Zimmers et al. | 709/200 |
| 6,980,993 | B2 * | 12/2005 | Horvitz et al. | 707/102 |
| 7,051,105 | B2 * | 5/2006 | Lauzon et al. | 709/227 |

FOREIGN PATENT DOCUMENTS

WO 01/09755 A2 2/2001

OTHER PUBLICATIONS

"About Managing Messages With Rules," Microsoft® Outlook® 2003 Help file, 3 pp.

"Trillian / Trillian Pro IM Clients" Product Description, © 1999-2004 Cerulean Studios, <http://www.ceruleanstudios.com> [retrieved Apr. 30, 2004].

Stelovsky, J., and C. Aschwanden, "Software Architecture for Unified Management of Event Notification and Stream I/O and Its Use for Recording and Analysis of User Events," *Proceedings of the 35th Annual Hawaii International Conference on System Sciences*, IEEE Computer Society, Big Island, Hawaii, Jan. 7-10, 2002, pp. 1862-1867.

Dey, A.K., "Providing Architectural Support for Building Context-Aware Applications," doctoral thesis, Georgia Institute of Technology, Nov. 2000, p. 24.

\* cited by examiner

*Primary Examiner*—John Follansbee
*Assistant Examiner*—Saket K Daftuar
(74) *Attorney, Agent, or Firm*—Shook, Hardy & Bacon LLP

(57) ABSTRACT

A system and method utilizing test notifications. An application is able to construct a test notification that is sent to a user context system and which receives back an indication whether the notification would draw or not draw on the screen at the present time, in accordance with the user's current context. In another embodiment, the calling application receives back richer indications, such as details as to whether the notification would have been deferred or routed, the sound level at which it would have played, etc. In a polling implementation, an application may periodically re-send test notifications to re-poll the system to determine if changes have occurred. In a subscription implementation, an application may subscribe to the system to receive updates that are provided when there are changes.

41 Claims, 14 Drawing Sheets

SYSTEM AND METHOD UTILIZING TEST NOTIFICATIONS

CROSS-REFERENCE(S) TO RELATED APPLICATION(S)

This application is related to U.S. application Ser. No. 10/692,324, titled "Extensible User Context System for Delivery of Notifications," filed concurrently with the present application, which is hereby incorporated by reference in its entirety.

FIELD OF THE INVENTION

The present invention relates to notifications in computing systems, and more particularly, a system and method utilizing test notifications.

BACKGROUND OF THE INVENTION

In computer systems, a notification may be in the form of a signal from a program that indicates to a user that a specified event has occurred. Such a notification may contain various elements of text, sound, and graphics. Other properties may also be included with the notification, such as priority, the person who sent the notification (for channels such as e-mail or instant messaging), and when the notification expires. Notifications may also include some elements of code such that the user can interact with the notification and launch arbitrary code (e.g., clicking on buttons or text within the notification that can cause new programs to launch or actions to be taken on programs that are currently running).

An operating system may create notifications to let a user know about network connectivity and updates. A instant messaging program that uses "contact lists" may draw notifications on the screen to let the user know what is happening with the contact list or when a contact initiates an instant message conversation. Other programs may provide similar notifications that draw in similar areas of the display. One issue with these types of notifications is that they aren't generally aware of the other notifications, thus sometimes leading to notifications being drawn on top of other notifications.

Another issue with existing notification systems is that they may cause notifications to be delivered inappropriately, or at inappropriate times. For example, for a user providing a full screen presentation, it may be inappropriate to have other programs draw notifications on the screen during the presentation. An example of a program that might draw such inappropriate notifications is a instant messaging program that runs in the background of the operating system and draws such notifications when contacts in the contact list sign on or initiate an instant message. This type of "interruption" during a presentation may be undesirable to a user.

The present invention is directed to providing a system and method that overcome the foregoing and other disadvantages. More specifically, the present invention is directed to a system and method utilizing test notifications.

SUMMARY OF THE INVENTION

A system and method utilizing test notifications is provided. In accordance with one aspect of the invention, a calling program constructs a test notification that is similar to an actual notification. A key difference from an actual notification is that the test notification will not actually be delivered to the user.

In accordance with another aspect of the invention, in one embodiment the test notification returns an indication of true or false. An indication of true means that an actual notification would have drawn at the present time, while an indication of false means that an actual notification would not have been able to draw at the present time. In another embodiment, richer return values may also be returned by the test notification. Examples of richer return values include whether the notification would have been deferred or routed, the sound level at which the notification would have played, etc.

In accordance with another aspect of the present invention, in one embodiment a polling method is utilized. In this embodiment, the calling program periodically re-polls (sends test notifications) to determine the user's current context and how any broadcast data should be changed that are sent by the calling program. An example of broadcast data could be a instant messaging program broadcasting a busy or free state to a contact. In another embodiment, a subscription callback method is utilized. In this embodiment, the calling program subscribes to receive context changes. In other words, rather than re-polling periodically, as the user's context changes as relevant to the type of information that is broadcast, the context engine calls back to the program with these updates. This latter embodiment has an advantage in that there is no lag between the context changes and what is broadcast. In other cases, the polling method may be more appropriate, such as for one-time events.

It will be appreciated that the testing system and method of the present invention allows the operating system and arbitrary programs to determine when it is appropriate to send notifications to the user. One advantage of utilizing test notifications is that by enabling a program to have a richer view of the user's context, unwanted actual notifications can be prevented from being generated until a user is in a receptive state. In addition, greater flexibility is provided for programs that do not utilize the same user interface for the delivery of notifications, in that by utilizing the test notifications they are still able to obtain information as to the user's context. As an example, a future program may develop a notification with specialized graphics that might not be supported by a present user context system, however the future program would still be able to utilize information obtained from a test notification to determine whether it is appropriate to send or modify its present notification.

In accordance with another aspect of the invention, the test notifications are utilized in a user context system. The user context system brokers and serializes the delivery of notifications from multiple sources. In addition, a shared notion of user context is provided, for determining the appropriate handling for each of the notifications. In accordance with these aspects, the notifications that are delivered by the user context system may be considered to be more valuable in that they are delivered when the user is more receptive to them. These aspects also provide for common rules which help the user to eliminate undesirable notifications. In one embodiment, the use of test notifications in the user context system essentially provides for a system tool or a system provided mechanism that is able to encapsulate a user's aggregated context and expose it to arbitrary processes.

In accordance with another aspect of the invention, in the user context system the contexts are declared by the operating system and arbitrary programs. In one embodiment, a user context comprises a condition that may be true or false, and an instruction that is to be followed if the condition is true. For example, a condition might be "when a user is listening to music," for which the instruction might be "deliver notifications on the screen but with no sound." In general, the condition for the user context can be thought of as a state that the system assumes makes the user in some way unavailable for notification delivery or that causes the way that the notification should be delivered to be different from how it was sent by the program that initiated it. The user may be in a state deemed "unavailable" in which case the notification is either not delivered or held until the user becomes "available." For instance, if the user is running a full screen application, where the application is using or being displayed on the full area of a display screen, that user may be deemed unavailable. Or, the user may be "available" but in such a state that the notification needs to be modified to be appropriate for the user.

In accordance with another aspect of the invention, in the user context system, in addition to the operating system declaring contexts, programs register with the system and declare the context they provide and the impact it has on notifications (as per if drawing on the screen is appropriate and the level of invasiveness that is appropriate for drawing on the screen and whether or not sound is appropriate or at what relative volume sound should be played at) and then tells the system whether the context is true or false. In one embodiment, the context may also be evaluated as true or false at the time that a notification is to be delivered. In one embodiment, the system may also track the process of the calling program, and if the process is no longer present, the context may be reset to false. By tracking the process, certain undesirable situations can be avoided, such as an application declaring a user as being busy, and then crashing, and then leaving the user stuck in a state in which they have been declared as not being available for receiving notifications.

In accordance with another aspect of the invention, in the user context system, there may be different levels of invasiveness specified for the drawing of notifications. In other words, based on the user context, there may be gradients for the drawing of notifications, such that there may be different levels of invasiveness in the form of the drawn notification. For example, a normal notification may be free to be drawn in the client area and briefly obscure a window. If the user is in a slightly restrictive context, the notification may be free to show, but only in a less invasive manner, such as it might not be allowed to draw on top of another window. As another example, if a user is running a maximized application, the setting may be that the user context is slightly restricted, in that the user has clearly made a statement that they want their current application to get the entire client area. In this circumstance, notifications may still be allowed to draw, but they may be made to only appear within the sidebar. This type of reduced invasiveness in the notification drawing form lessens the impact of the notifications, and lessens the cognitive load.

In accordance with another aspect of the invention, in the user context system the contexts that have been provided are exposed to the user and can either be turned off (e.g., the user doesn't agree with the program's assessment of the context) or changed in terms of the impact on delivery.

In accordance with another aspect of the invention, in the user context system the user may define rules that dictate how notifications that contain specified elements should be delivered. For example, a user rule might dictate that any notifications received from "John Doe" and with "urgent" in the subject line, should be delivered immediately. In one embodiment, such user rules are given precedence over the user contexts. The user rules are made available to the user for modification in accordance with the user's preferences.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention is directed to a system and method that utilizes test notifications. In one embodiment, the test notifications may be processed by a user context system. The user context system controls the delivery of notifications.

In prior systems, there have typically been numerous competing elements which want to send notifications to a user, each of which designs its own way to send such notifications. None of the competing elements have generally been aware of the other notifications and thus have tended to draw on top of each other and each other's applications, which can lead to conflicts when each chooses to render an indication of their respective notifications at the same time. Additionally, there has been no shared notion of user context, leading to some notifications being delivered inappropriately, or at inappropriate times. The user context system addresses these issues by building notifications as a rich part of the operating system, such that the user interfaces for notifications provided by the user context system become similar and thus stop conflicting with one another because the system appropriately brokers and serializes their on-screen rendering. In addition, the notifications provided by the user context system can be considered to be more valuable because they are delivered when the user is more receptive to them, and in addition the use of common rules helps the user to eliminate undesired notifications.

As noted above, the user context system may be utilized to process the test notifications of the present invention. The test notifications of the present invention are used to determine if actual notifications would be delivered under present conditions. In other words, the test notifications are intended to provide an indication of whether a user is currently available for receiving notifications. This indication, can be used, for example, to prevent a program from attempting to send an actual notification at the present time, or to cause the program to modify the notification.

Figure 1:
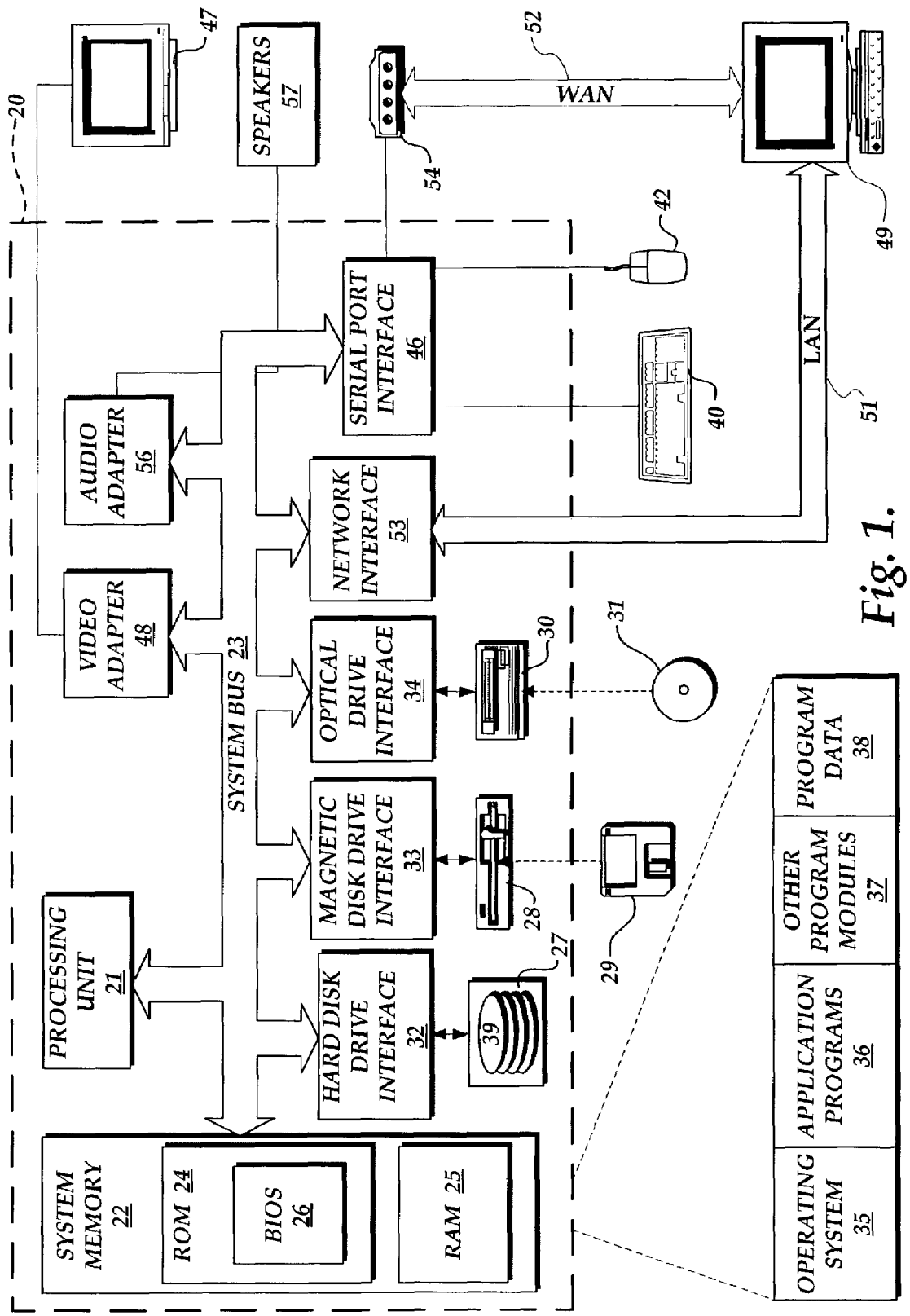
FIG. 1 is a block diagram of a general purpose computer system suitable for implementing the present invention.

FIG. 1 and the following discussion are intended to provide a brief, general description of a suitable computing environment in which the present invention may be implemented. Although not required, the invention will be described in the general context of computer-executable instructions, such as program modules, being executed by a personal computer. Generally, program modules include routines, programs, characters, components, data structures, etc., that perform particular tasks or implement particular abstract data types. As those skilled in the art will appreciate, the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that helps to transfer information between elements within the personal computer 20, such as during start-up, is stored in ROM 24. The personal computer 20 further includes a hard disk drive 27 for reading from or writing to a hard disk 39, a magnetic disk drive 28 for reading from or writing to a removable magnetic disk 29, and an optical disk drive 30 for reading from or writing to a removable optical disk 31, such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer-readable instructions, data structures, program modules, and other data for the personal computer 20. Although the exemplary environment described herein employs a hard disk 39, a removable magnetic disk 29, and a removable optical disk 31, it should be appreciated by those skilled in the art that other types of computer-readable media which can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk 39, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus 23, but may also be connected by other interfaces, such as a parallel port, game port or a universal serial bus (USB). A display in the form of a monitor 47 is also connected to the system bus 23 via an interface, such as a video card or adapter 48. One or more speakers 57 may also be connected to the system bus 23 via an interface, such as an audio adapter 56. In addition to the display and speakers, personal computers typically include other peripheral output devices (not shown), such as printers.

The personal computer 20 may operate in a networked environment using logical connections to one or more personal computers, such as a remote computer 49. The remote computer 49 may be another personal computer, a server, a router, a network PC, a peer device or other common network node, and typically includes many or all of the elements described above relative to the personal computer 20. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20 or portions thereof may be stored in the remote memory storage device. It will be appreciated that the network connections shown are exemplary, and other means of establishing a communications link between the computers may be used.

The present invention may be implemented on a system of the type illustrated in FIG. 1. As noted above, the test notifications of the present invention may be evaluated by a user context system. A user context system for evaluating the test notifications will primarily be described with respect to FIGS. 2-10 below. The evaluation of the test notifications will be described in more detail in later sections with respect to FIGS. 11-14.

In regard to FIGS. 2-10, a user context system is provided for controlling the delivery of notifications from multiple sources. In one embodiment, the user context system may consist of three elements that are compared for a decision as to how to process a notification. The first element is the user's context (as may be provided by the operating system and arbitrary programs that have extended it). The second element is the user's rules and preferences. The third element is the notification itself (which contains elements such as data and properties that may match the user's rules).

As will be described in more detail below, the user context system operates by the operating system and other programs declaring a user's contexts, after which the system brokers the user's context and rules. Notifications are raised by other programs calling into the system. The user's context, rules, and elements of the notification are compared and then a determination is made as to what should be done with the notification. Examples of various options for what may be done with the notification include denying (if the notification is not allowed to draw or make noise, and the notification is to never be seen by the user), deferring (the notification is held until the user's context changes or the user's rules dictate that it is subsequently appropriate to deliver), delivering (the notification is allowed to be delivered in accordance with the user's context and rules), and routing (the user's rules indicate that the notification should be handed off to another system, regardless of whether the notification is also allowed to be delivered in the present system).

Various routines for delivering a notification are described in more detail below. In general, the user may be in a state deemed "unavailable" in which case the notification is either not delivered or held until the user becomes "available". For instance, if the user is running a full screen application, that user may be deemed unavailable. Or, the user may be "available" but in such a state that the notification needs to be modified to be appropriate for the user. For instance, if the user is listening to music or in a meeting, the user may have indicated that the notifications should be delivered to the user's screen but that the sound they make should be either quieter or not made at all.

As noted above, the user context determines in part whether notifications are shown on the user's screen. When a notification is shown, it may be shown based on certain gradients within the user context. In other words, there are different levels of invasiveness of the form of the drawn notification that may be specified. For example, a normal notification is free to pop out into the client area and briefly obscure a window. If the user is in a slightly restrictive context, the notification may be free to show, but only in a less invasive manner, such as it might not be allowed to draw on top of another window. As another example, in one embodiment where the user is running a maximized application, the default setting may be that this means that context is slightly restricted, and that the user has clearly made a statement that they want this application to get the entire client area. In this setting, a notification may still be allowed to draw, but may be made to only appear within the sidebar. In other words, this type of reduced invasiveness in the notification drawing form lessens the impact of the notification, and overall lessens the cognitive load.

Figure 2:
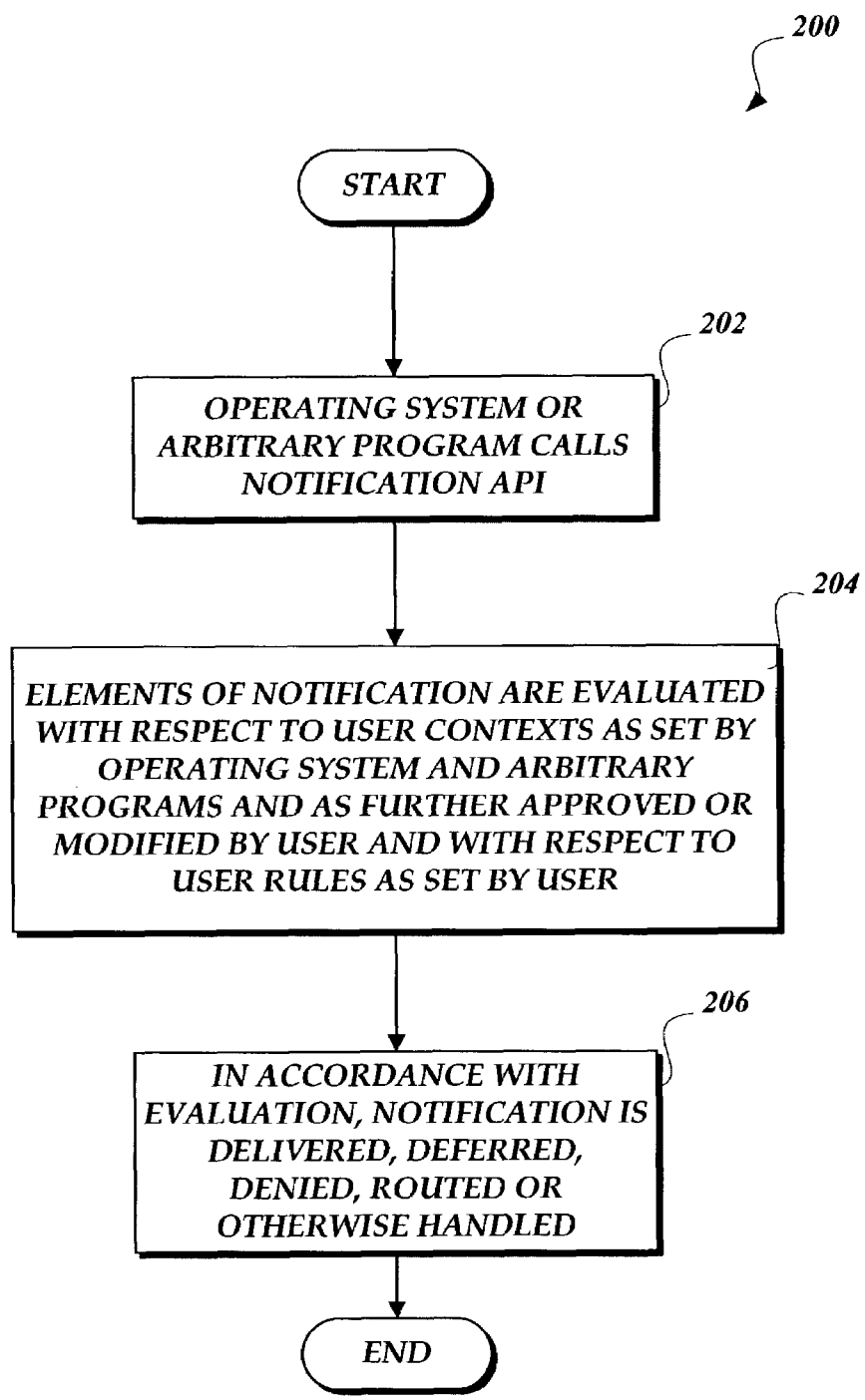
FIG. 2 is a flow diagram illustrative of a general routine for processing a notification in accordance with the present invention.

FIG. 2 is a flow diagram illustrative of a routine 200 for processing a notification. At a block 202, the operating system or an arbitrary program calls a notification application programming interface (API). At a block 204, the elements of the notification are evaluated with respect to user contexts as set by the operating system and arbitrary programs, and as further approved or modified by the user, and with respect to user rules as set by the user. At a block 206, a notification is delivered, deferred, denied, routed, or otherwise handled in accordance with the user contexts and user rules.

The user contexts and user rules will be described in more detail below. In one embodiment, a user context consists of a condition that may be either true or false, and an instruction for determining how a notification should be handled when the condition is true. In general, the condition of a user context can be thought of as a state that the system assumes makes the user in some way unavailable for notification delivery or that causes the way that the notification is delivered to be different from how it was sent by the program that initiated it. In other words, in one embodiment a user context can be thought of as a statement that "while condition X is true, then this is what should be done with incoming notifications." An example would be "when my music player is playing music for me, incoming notifications should show on the screen but not play sound." Another example would be "while any application is running in full screen mode, incoming notifications should be deferred until later."

With respect to such user contexts, in one embodiment a user may also define special rules for handling incoming notifications, and thus may provide for special exceptions to the instructions of the user contexts. As an example, a user rule might state "when I receive a new e-mail from 'John Doe,' and with 'urgent' in the text, and marked 'high priority,' deliver the e-mail regardless of other user contexts." In other words, in this example this user rule provides an exception to a user context which would otherwise indicate that it is inappropriate to deliver a notification for an incoming e-mail at this time. With regard to the elements of the notification that the user rules are evaluated with respect to, these may include things like text, sound, graphics, and other properties such as priority, the person who sent the notification (for channels such as email or instant messaging), when the notification expires, and some elements of code such that the user can interact with the notification and launch arbitrary code (e.g., clicking on buttons or text within the notification can cause new programs to launch or actions to be taken [such as deleting email] on programs that are currently running).

Figure 3:
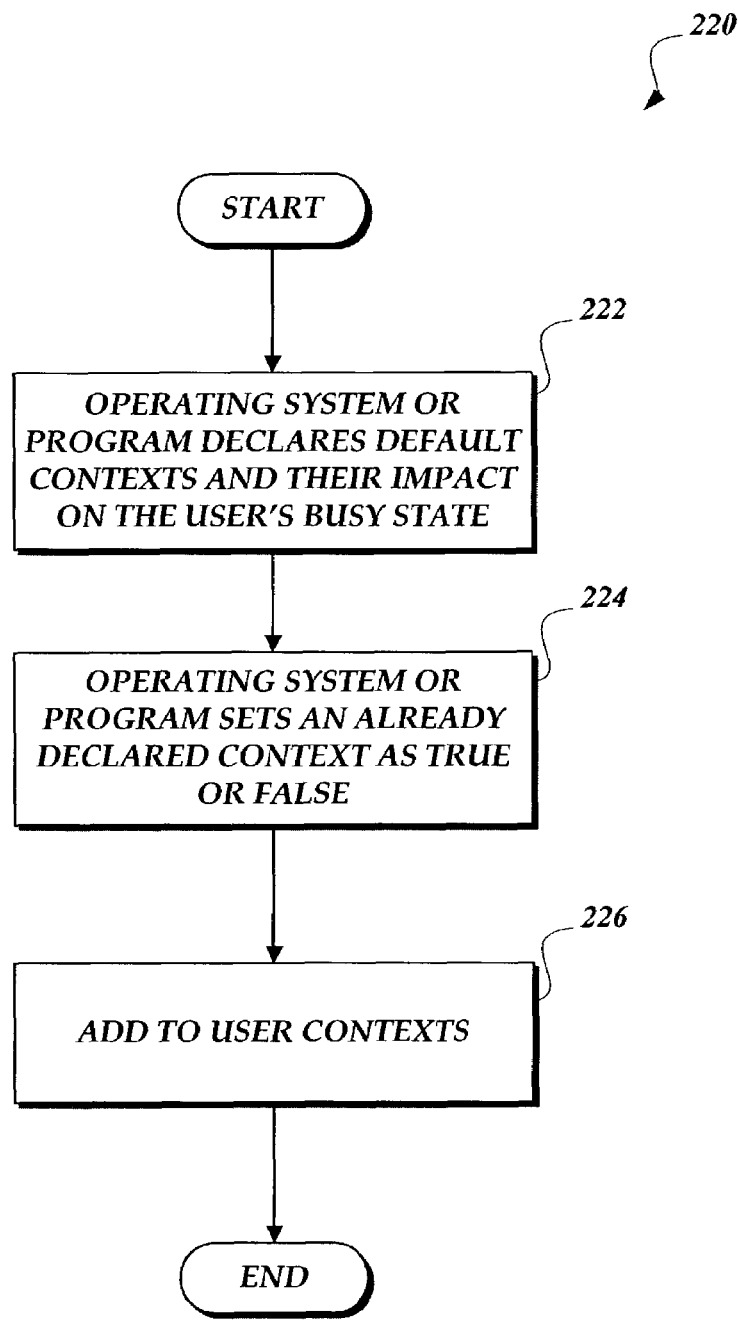
FIG. 3 is a flow diagram illustrative of a routine for an operating system or arbitrary program declaring user contexts.

FIG. 3 is a flow diagram illustrative of a routine 220 for an operating system or arbitrary program declaring user contexts. At a block 222, the operating system or program declares the default contexts and their impact on the user's busy state. In other words, programs register with the system and provide user contexts including the impact they have on the notifications (e.g., if drawing on the screen is appropriate and whether or not sound is appropriate or at what relative volume sound should be played). As an example, a music player program may declare a default context that states "when the music player is playing music for the user, incoming notifications should show on the screen but not play sound." As another example, the operating system might declare a context which states "while any application is running in full screen mode, incoming notifications should be deferred until a later time."

Returning to FIG. 3, at a block 224, the operating system or program sets the declared context as true or false. For example, with regard to the music player declaring the context of "when the music player is playing music, incoming notifications should show on the screen but not play sound," the music player program also sets this declared context as currently being true or false. In other words, the music player program indicates whether it is true or false that the music player is currently playing music. As will be described in more detail below, in one embodiment, the determination of whether a context is true or false may also be evaluated at the time the notification API is called, or at the time the user rules and exceptions are re-evaluated. As an additional feature, the system may also track the process handle of the calling program, such that if the process terminates without first resetting the context value to its default 'false' value, the system will reset the context value as soon as it detects that the initial process does not exist any more (in one embodiment, the process handle state is set to signal when the process terminates, and that state change is picked up by the system which watches the process handle). This ensures that if processes terminate unexpectedly or forget to reset the context, then the delivery of further notifications will not be unduly affected. For example, if in the above example the music player program has been closed and the process is no longer present, then the context may automatically be reset to false. As another example, if a program originally declares a user as being busy, but then the program crashes, such that the process is no longer present, the context may automatically be set to false rather than leaving the user stuck in a state where notifications would not be received. In any event, whether or not a context is actively set or is evaluated as a function, in one embodiment the contexts can generally be resolved to be either true or false.

Returning to FIG. 3, at a block 226, the context information is added to the user contexts that are stored in the system. This process is repeated by additional programs declaring contexts. In addition, as noted above, the state of whether already declared contexts are true or false will change over time as the user opens and closes different programs and undertakes different tasks.

As noted above, in one embodiment registering a context is a declarative process. As will be described in more detail below, in the user context system, by registering the user contexts, the user can be presented with a list of the contexts so that the user can choose to not accept certain contexts or to change what they mean if the user disagrees with the context parameters. As noted above, in one embodiment, a context may consist of a condition that may be true or false, and an instruction for what to do with notifications when the condition is true. In this regard, a user context may comprise specific programming elements, such as: a human readable string (for the end user to know what is meant); a unique identifier (such as a globally unique identifier, aka GUID) so that the program can tell the operating system when this context is true or not; and the instruction which may comprise a statement of what this context means in terms of notifications drawing on screen (as may include invasiveness level, sound, and volume). A context may also be dynamic, as will be described in more detail below.

Figure 4:
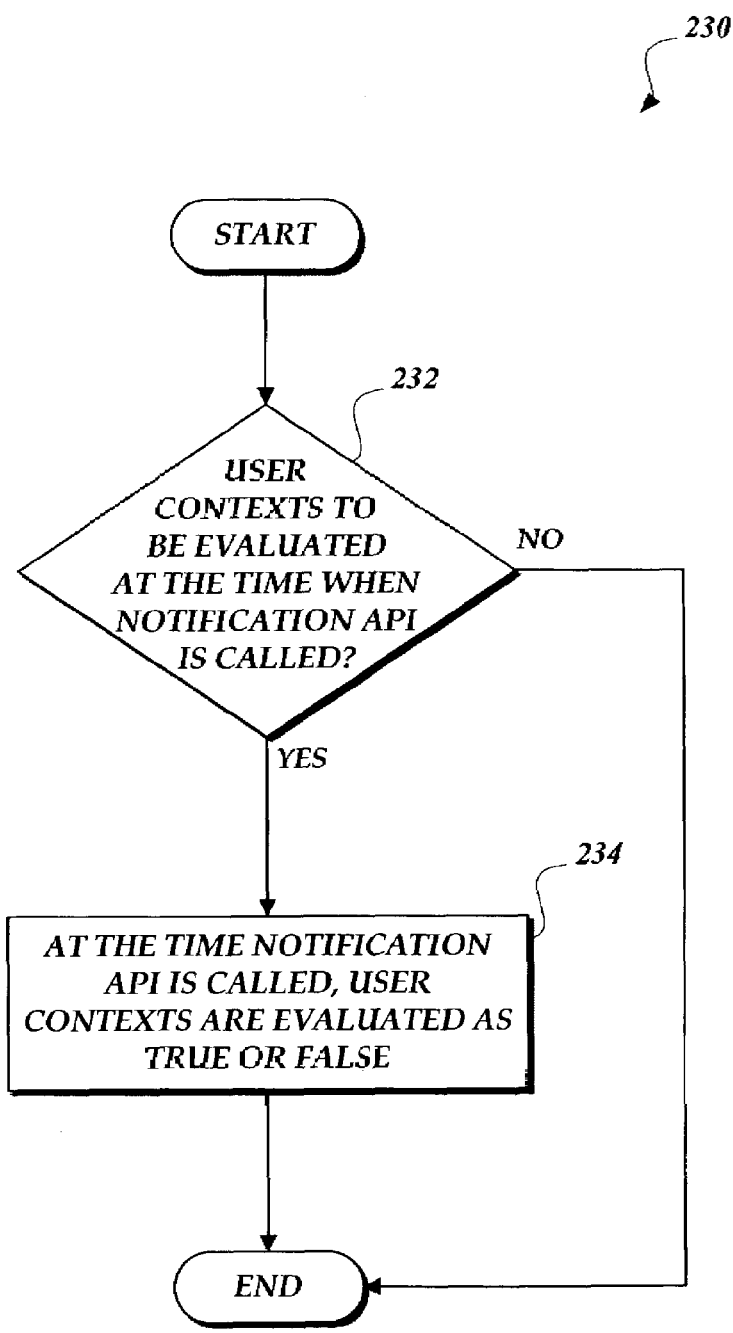
FIG. 4 is a flow diagram illustrative of a routine for evaluating user contexts as true or false at the time a notification API is called.

FIG. 4 is a flow diagram illustrative of a routine 230 for a context to be evaluated as true or false at the time the notification API is called. At a decision block 232, a determination is made whether the user contexts are to be evaluated at the time when the notification API is called. If the user contexts are to be evaluated, then the routine proceeds to block 234. If the user contexts are not to be evaluated at the time when the notification API is called, then the routine ends. At block 234, the user contexts are evaluated as true or false.

As illustrated by FIGS. 3 and 4 and as noted above, a context may be proactively set or it may be a function that is evaluated at a relevant time. As an example, a program may actively note that a user is listening to music. As another example, when a notification is evaluated, the program may have registered its callback such that the program is queried by the system at the time the notification is evaluated whether the context is true. One example of a case where this second process can be particularly important is when a user context is combined with a user rule to form a dynamic context. (User rules will be described in more detail below.) A specific example of a user context combined with a user rule would be when a user has set a rule that states "people who I'm meeting with right now can always send me notifications irrespective of my busy state." In this case, the user context of "when the user is in a meeting," must further be evaluated in terms of who the user is in the meeting with. In this example, the program that handles the meetings may register this as a dynamic context, and when a notification is evaluated, the person who sent the notification is evaluated against this context (which otherwise could not be declared as true or false proactively, since the people attending the meeting may change over time). In other words, this particular example requires evaluation of a user's context in light of a user rule that depends on other people's contexts.

Figure 5:
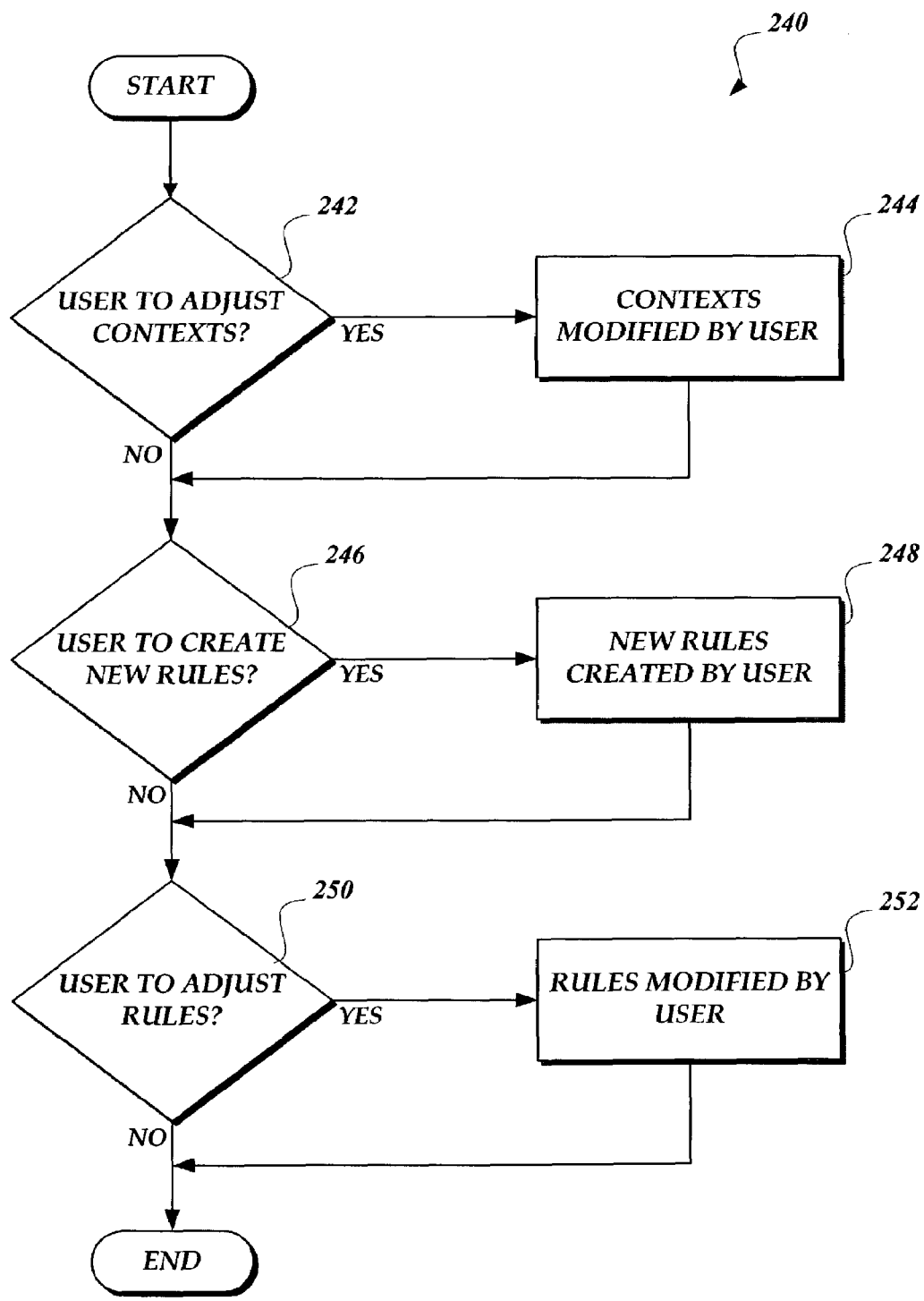
FIG. 5 is a flow diagram illustrative of a routine for adjusting user contexts and creating new user rules.

FIG. 5 is a flow diagram illustrative of a routine 240 by which a user may adjust contexts and create new rules. At a block 242, a determination is made whether the user wishes to adjust the contexts. If the user does not wish to adjust the contexts, then the routine proceeds to a decision block 246, as will be described in more detail below. If the user does wish to adjust the context, then the routine proceeds to a block 244, where the user makes modifications to the contexts.

In one embodiment, the contexts that have been provided may be exposed to a user in a manner which allows the user to either turn the contexts off (e.g., the user doesn't agree with the program's assessment of the context), or to change the context in terms of the impact on delivery of a notification. As more specific examples, user contexts can include things like "while any application is running in full screen mode"; "when I'm playing music or video"; "when my meeting manager shows me in a meeting"; or "when my out of office assistant is turned on." For each of these, the user could be allowed to make selections that specify an instruction that when the given condition is true, the incoming notifications should follow selected procedures. The instructions can specify things like whether or how the notification will draw on the screen, and the sound or volume that the notification will make. For the volume, the user can specify a percentage of desired volume under the given condition. For the options for drawing the notification on the screen, the user can be provided with options such as not drawing the notification at all, or drawing the notification only on a specified external display, or drawing the notification on the present screen. For the drawing of a notification, different levels of invasiveness can be specified. For example, if a user is running a maximized application, such that the context is slightly restricted, the invasiveness setting might be such that notifications can still draw, but might appear only within a sidebar.

Returning to FIG. 5, at decision block 246, a determination is made whether the user wishes to create new user rules. If the user does not wish to create new user rules, then the routine proceeds to a decision block 250, as will be described in more detail below. If the user does wish to create new user rules, then the routine proceeds to a block 248, where new rules are created. In general, user rules dictate how notifications that contain specified elements should be handled. For example, a rule may dictate that notifications from a specified person should always be delivered immediately, and this rule can be applied to all notifications, irrespective of which program initiated the notification as long as it is from the specified person. As more specific examples, other user rules may be directed to things like "MSN auto's traffic alerts for Bremerton, Wash." and "important e-mails from John Doe." As an example of a user rule for an important e-mail from John Doe, the rule could dictate that any e-mails that arrive from John Doe, and with "urgent" in the text, and marked "high priority," should follow specified handling conditions. The handling conditions could specify that the notification should be delivered immediately and that the user should be required to acknowledge it. In general, requiring a user to acknowledge a notification means that there is a slightly raised elevation in the form of the notification's invasiveness, in that the notification will stay on-screen until the user specifically dismisses it. In one embodiment, the requiring of a user's acknowledgement is only settable via a user rule. As another example, the rules could also specify a custom sound to be played for the notification, at a specified volume, so as to provide an alert to the user that a special notification has arrived. Different settings may also be selected for how the notification should be handled during "normal" and "busy" conditions for the user, as may be determined by the user's context. The handling instructions may also include things like routing options for the notification, such as "deliver notifications from John Doe to my pager." In one embodiment, when the context is evaluated, the most restrictive currently true context is the one that is applied. When user rules are evaluated, it means that a particular notification has matched the rule that the user has created, in which case the most invasive setting is applied from the user rules which have matched the notification. In other words, in the user rules, a user has specified something to be of importance, and this procedure is intended to follow the user's preferences. If there is a conflict between two rules, the most invasive is applied.

In one embodiment, the user rules may also be directed to controlling the delivery of notifications from specific notification services. For example, an operating system that provides notifications in accordance with a notification service may provide the user with a way to modify how the notifications are delivered. For example, the specified notification service may provide "traffic alerts for Seattle", and the user may edit the delivery to be such that when such notifications are received the system should "show the notification and play sound."

Returning to FIG. 5, at decision block 250, a determination is made whether the user wishes to adjust any of the already existing user rules. If the user does not wish to adjust any of the rules, then the routine ends. If the user does wish to adjust the user rules, then the routine proceeds to a block 252, where the user makes modifications to the rules.

As described above with respect to FIGS. 3-5, the user contexts and user rules are set by the operating system, programs, and the user. The system appropriately brokers and serializes the delivery of the notifications in accordance with the user's preferences. The user contexts and user rules may be exposed to the user such that the user can modify or adjust the various contexts and rules, or create new rules. This provides the user with a centralized way to manage preferences for how notifications are handled. It will be appreciated that this allows a user to effectively manage the many competing elements in a computing system that may want to send notifications to the user.

Figure 6:
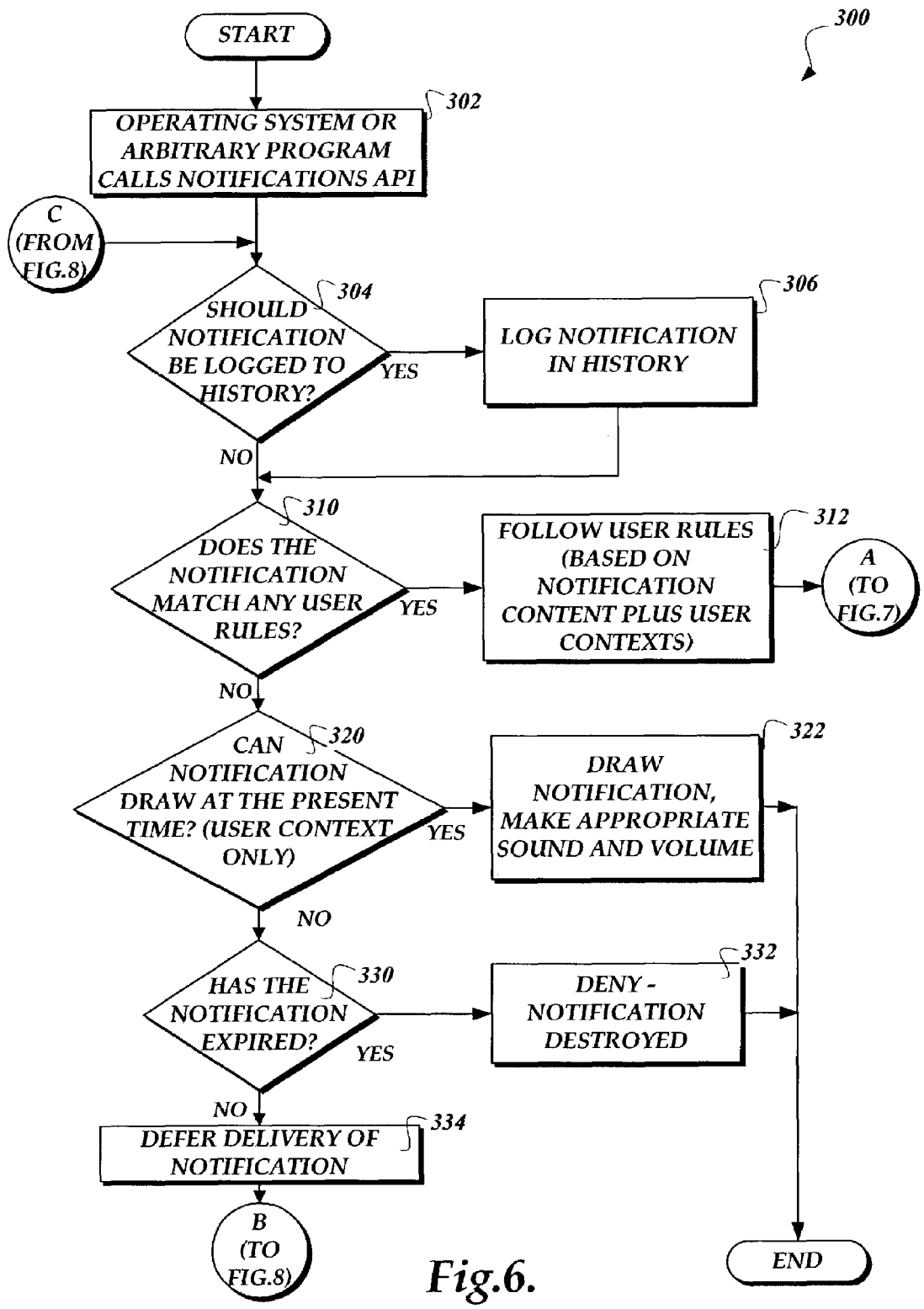
FIG. 6 is a flow diagram illustrative of a routine for processing a notification in accordance with user contexts and user rules.

FIG. 6 is a flow diagram illustrative of a routine 300 for processing a notification in accordance with user contexts and user rules. At a block 302, the operating system or an arbitrary program calls the notifications API. At a decision block 304, a determination is made whether the notification should be logged to the notification history. If the notification is to be logged, then the routine proceeds to a block 306, where the notification is logged to the history. If the notification is not to be logged, then the routine proceeds to a decision block 310.

At decision block 310, a determination is made whether the notification matches any user rules. If the notification matches any user rules, then the routine proceeds to a block 312, where the user rules are followed (based on the notification content plus the user contexts), and the routine continues to a point A that is continued in FIG. 7. If at decision block 310 the notification does not match any user rules, then the routine continues to a decision block 320.

In one embodiment, user rules always outweigh the current user contexts. As noted above, user rules can be based on any element of the notification. For example, a rule that is based on an evaluation of the person who initiated the notification, can be applied to all notifications, irrespective of which program initiated the notification as long as it is from the person on which the rule is based (e.g., "John Doe" can always reach me). In addition, notifications may draw on the screen even during contexts that would otherwise cause it not to draw (e.g., "people who are in a meeting with me can always send me notifications", even though the user context generally states that the user is not to receive notifications during a meeting).

Returning to FIG. 6, at decision block 320, a determination is made whether the notification can draw at the present time (based on the user context only). If the notification can draw at the present time, then the routine continues to a block 322, where the notification is drawn, and appropriate sound and volume are provided. If it is not appropriate to draw the notification at the present time, then the routine proceeds to a decision block 330.

At the decision block 330, a determination is made whether the notification has expired. If the notification has expired, then the routine proceeds to a block 332, where the notification is destroyed. If the notification has not expired, then the routine proceeds to a block 334, where the notification is deferred, and the routine continues to a point B that is continued in FIG. 7.

Figure 7:
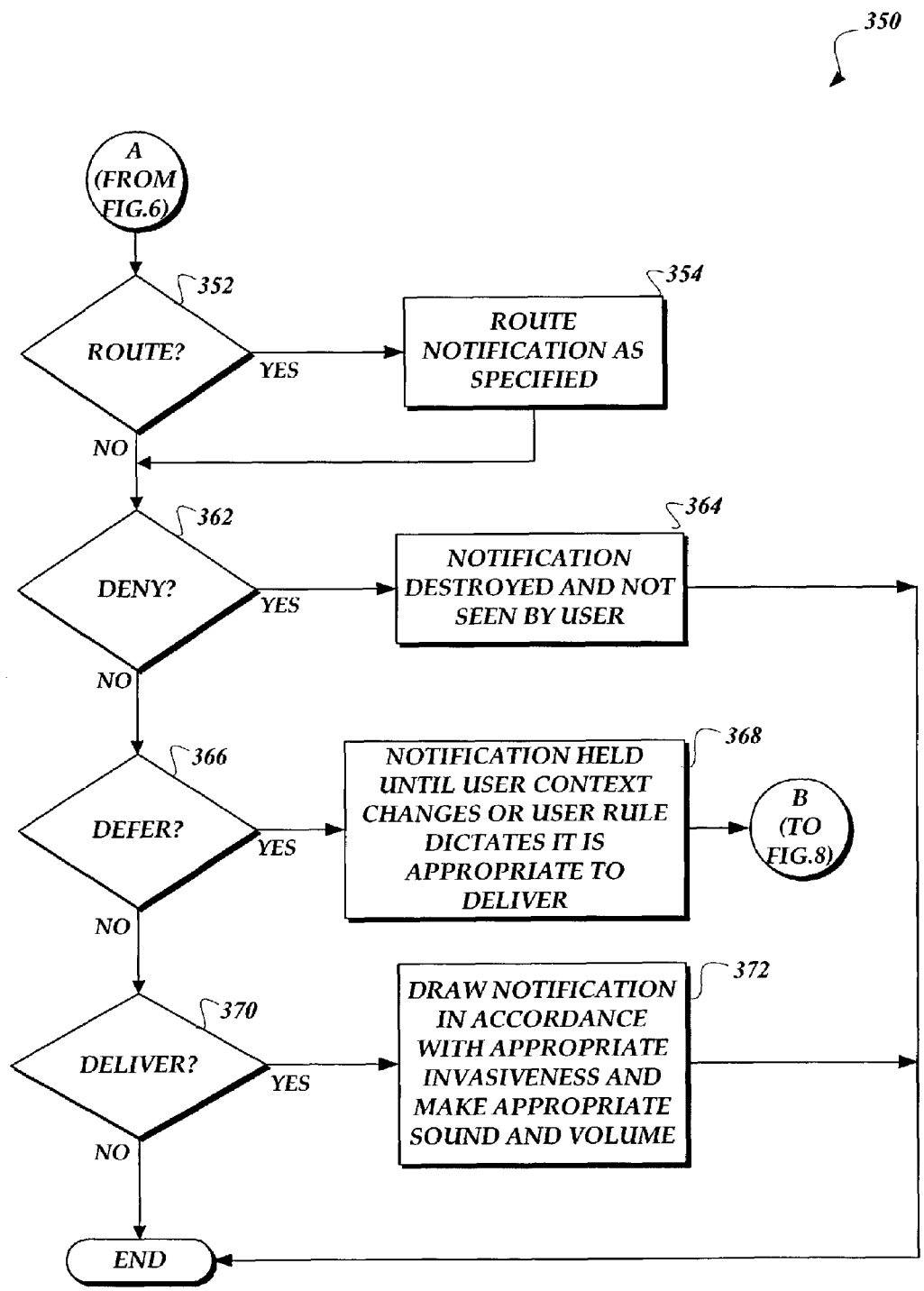
FIG. 7 is a flow diagram illustrative of a routine for implementing user rules based on a notification's content and the user contexts.

FIG. 7 is a flow diagram illustrative of a routine 350 for processing a notification in accordance with specified user rules. The routine is continued from a point A from FIG. 6, as described above. As illustrated in FIG. 7, at a decision block 352, a determination is made whether the notification should be routed. If the notification is not to be routed, then the routine continues to a decision block 362, as will be described in more detail below. If the notification is to be routed, then the routine proceeds to a block 354, where the notification is routed as specified. When a notification is routed, it indicates that the notification contains elements that match the user's rules that require the notification to be handed off to another system. This may happen if the user is busy, or it may happen on every notification that matches the criteria specified in the user's rules, whether or not the user is unavailable. As an example, a notification with the word "urgent" in it might always be forwarded to the user's pager, whereas other notifications might only be routed based on a combination of the user's rules and context.

Some examples of routing instructions include: "Forward this notification to an e-mail address"; "forward this notification to another PC"; "forward this notification to a pager"; "forward this notification to a cell phone"; or "forward this notification to an e-mail server." As will be described in more detail below, if the notification is routed, it may also be delivered and draw on the screen. In addition, the device to which the notification is forwarded may have this same context system implemented, and on that device there may be additional or different knowledge of the user's context, and the context system on that device may choose to do different actions with the notification.

Returning to FIG. 7, at decision block 362, a determination is made whether to deny the notification. If the notification is not to be denied, then the routine continues to a decision block 366, as will be described in more detail below. If the notification is to be denied, then the routine proceeds to a block 364 where the notification is destroyed and not seen by the user. In other words, a notification that is denied is not allowed to draw or make noise. For example, this may occur based on a user rule that states that a certain notification should be denied, or as described above with reference to block 332 of FIG. 6, when a notification has expired.

Returning to FIG. 7, at decision block 366, a determination is made whether the notification should be deferred. If the notification is not to be deferred, then the routine proceeds to a decision block 370, as will be described in more detail below. If the notification is to be deferred, then the routine proceeds to a block 368, where the notification is held until a user context changes, and the routine continues to a point B that is continued in FIG. 8. In general, deferring a notification indicates that the notification will be allowed to be delivered, but that the user's current context or rules are such that it is deemed inappropriate to deliver the notification at this time. As will be described in more detail below with reference to FIG. 8, once the user's context changes or alternatively when the user's rules indicate that it is subsequently appropriate, the notification will be delivered to the user's screen and allowed to draw and/or make its sound, as dictated by the user rules and user context.

Returning to FIG. 7, at decision block 370, a determination is made whether the notification should be delivered. If the notification is not to be delivered, then the routine ends. If the notification is to be delivered, then the routine proceeds to a block 372, where the notification is drawn in accordance with the appropriate level of invasiveness, and the appropriate sound and volume are provided. In other words, the notification is allowed to be delivered, though it is delivered in accordance with the user's context and rules (e.g., a notification may be allowed to be drawn but required to be silent).

Figure 8:
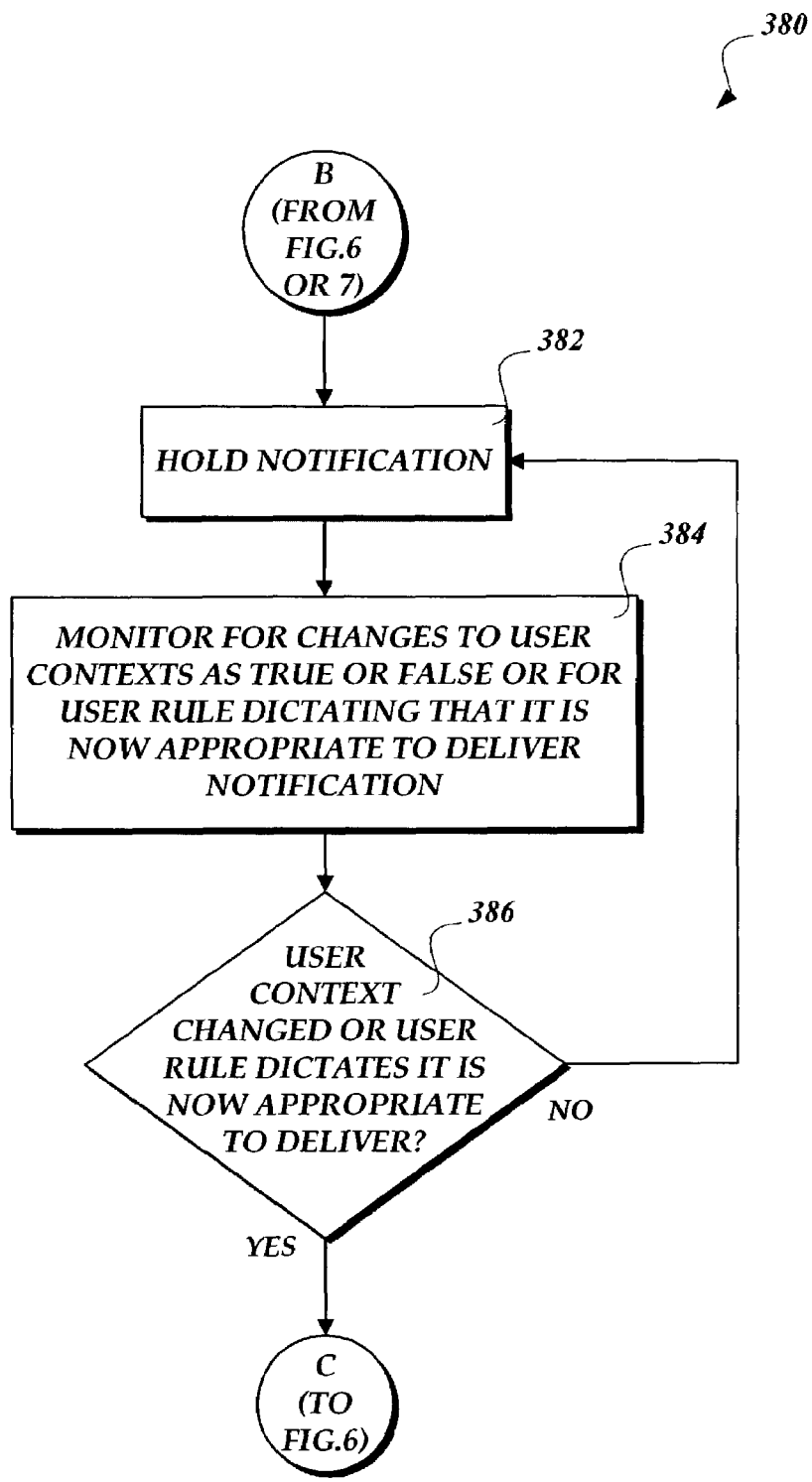
FIG. 8 is a flow diagram illustrative of a routine for deferring the delivery of a notification.

FIG. 8 is a flow diagram illustrative of a routine 380 for deferring the delivery of a notification. The routine is continued from a point B from either FIG. 6 or 7, as described above. As illustrated in FIG. 8, at a block 382, the notification is held. At a block 384, the system monitors for changes to the declared contexts as being true or false, or for a user rule dictating that it is now appropriate to deliver the notification. At a decision block 386, a determination is made whether a user context has changed, or a user rule dictates that it is now appropriate to deliver the notification. If a user context has not changed and if no user rule otherwise dictates, then the routine returns to block 382, where the notification continues to be held. If the user context has changed or if a user rule dictates that it may now be appropriate to deliver the notification, then the routine proceeds to a point C which is continued in FIG. 6. Point C in FIG. 6 returns to the decision block 304, where the process for evaluating the notification starts over.

Figure 9:
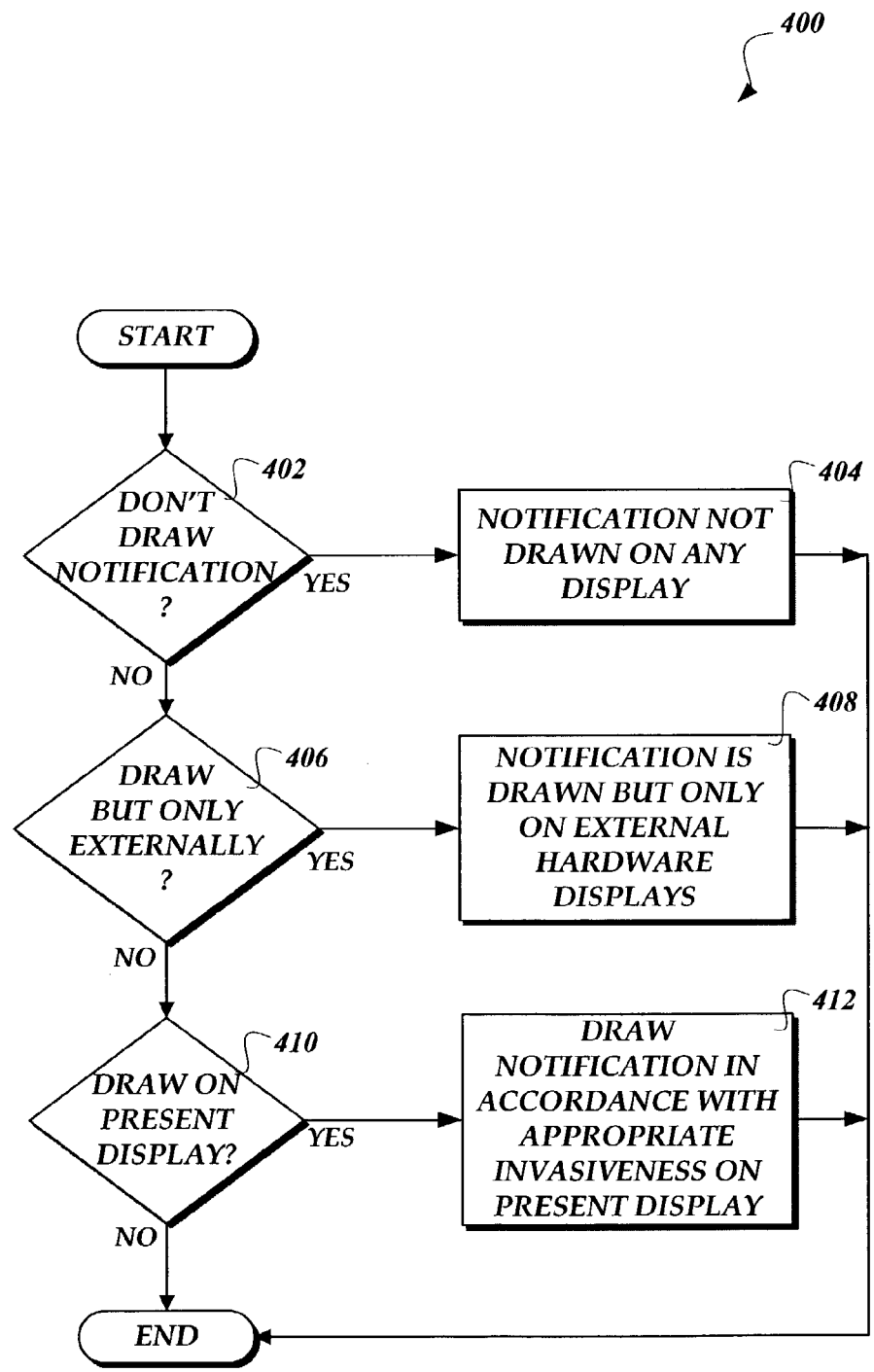
FIG. 9 is a flow diagram illustrative of a routine for determining how a notification will be drawn in accordance with various restrictive settings.

FIG. 9 is a flow diagram illustrative of a routine 400 for determining the drawing of a notification in accordance with various restrictions. It will be appreciated that this routine may be implemented as part of the processing of notifications, such as at block 322 of FIG. 6 or block 372 of FIG. 7. In general, when a notification enters the system, an evaluation is made of all of the contexts that are currently true, and the most restrictive settings for the notification are applied in accordance with the user's current state. As illustrated in FIG. 9, at a decision block 402, a determination is made whether the notification should not be drawn at all. If the notification is not to be drawn at all, then the routine proceeds to a block 404, where the notification is set to not be drawn on any display. If the notification is to be drawn, then the routine proceeds to a decision block 406.

At decision block 406, a determination is made whether the notification should be drawn but only externally. If the notification is only to be drawn externally, then the routine proceeds to a block 408, where the notification is drawn but only on external hardware displays. If the notification is not to be drawn on external hardware displays, then the routine proceeds to a decision block 410.

At decision block 410, a determination is made whether the notification should be drawn on the present display. If the notification is to be drawn on the present display, then the routine proceeds to a block 412, where the notification is drawn in accordance with the appropriate level of invasiveness on the present display. If the notification is not to be drawn on the present display, then the routine ends.

Figure 10:
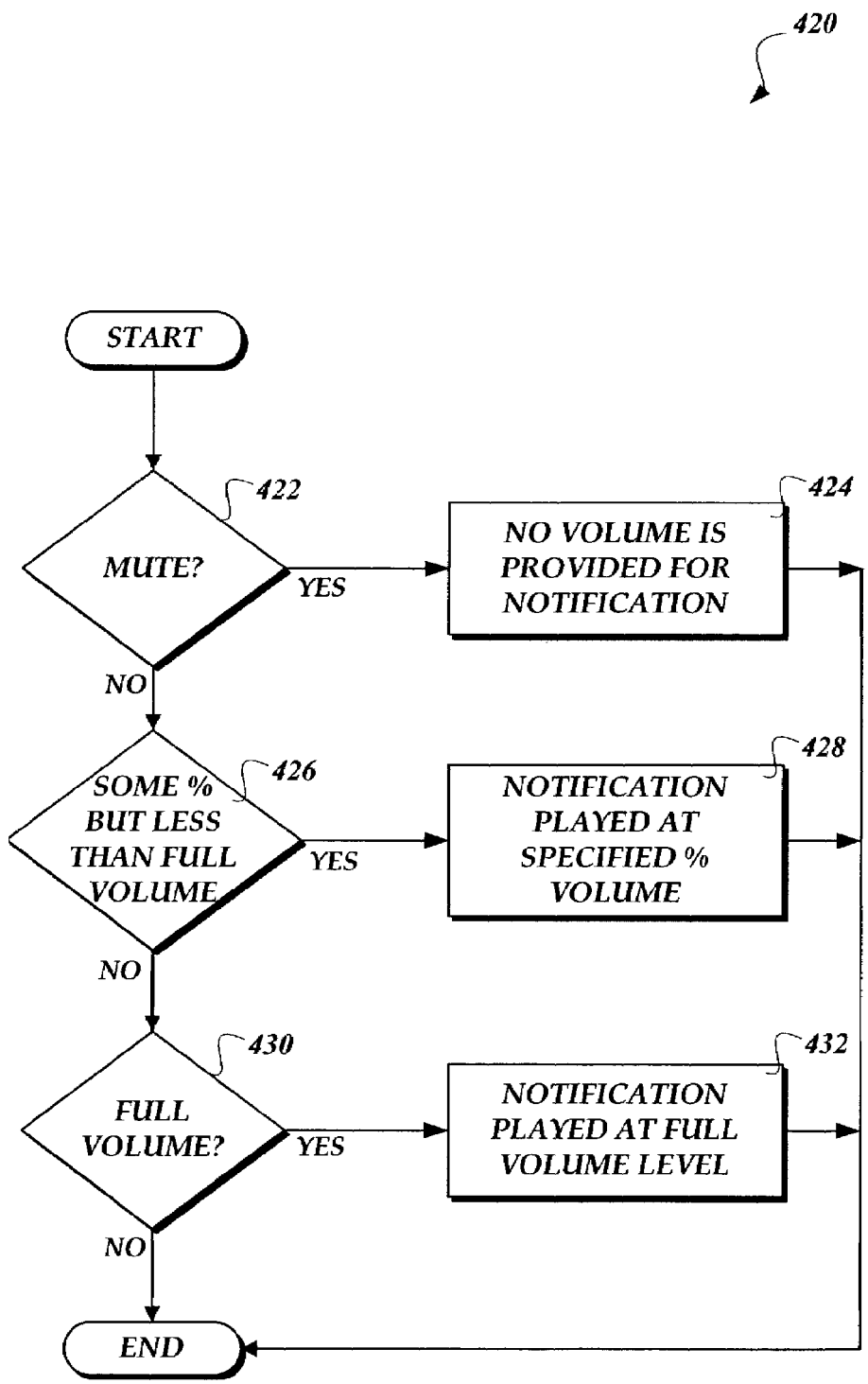
FIG. 10 is a flow diagram illustrative of a routine for determining a volume level for a notification in accordance with various restrictive settings.

FIG. 10 is a flow diagram illustrative of a routine 420 for determining the volume that will be played for the sound of a notification, in accordance with various restrictions. As was described above with respect to FIG. 9, it will be appreciated that this routine may be implemented as part of the processing of notifications, such as at block 322 of FIG. 6 or block 372 of FIG. 7. When the notification enters the system, an evaluation is made of all the contexts that are currently true, and the most restrictive settings are applied to the notification in accordance with the user's current state. As illustrated in FIG. 10, at decision block 422, a determination is made whether the notification should be muted. If the notification is to be muted, then the routine proceeds to a block 424, where no volume is provided for the notification. If the notification is not to be muted, then the routine proceeds to a decision block 426.

At decision block 426, a determination is made whether the notification should be provided with some percentage but less than full volume. If some percentage volume is to be provided, then the routine proceeds to a block 428, where the notification is played at the specified percentage volume. If a specified percentage volume is not to be provided, then the routine proceeds to a decision block 430.

At decision block 430, a determination is made whether full volume should be provided for the notification. If full volume is to be provided, then the routine proceeds to a block 432, where the notification is played at the full volume level. If full volume is not to be provided, the routine ends. In one embodiment, in addition to providing for different volume levels for the notification, different sounds may also be selected for the notification in accordance with the user context and rules.

It will be appreciated that the user context system as described above with respect to FIGS. 1-10, controls the delivery of notifications from various sources such that the notifications stop conflicting with one another because the system appropriately brokers and serializes their on-screen rendering. In addition, the notifications that are processed by the user context system can be considered to be more valuable because they are delivered when the user is more receptive to them, and in addition the use of common rules helps the user to eliminate undesired notifications.

FIGS. 11-14 are directed to the evaluation of test notifications. As will be described in more detail below, in accordance with one aspect of the present invention the test notifications can be utilized by any program to obtain information about the current state of a user context. One advantage of this aspect is that the user context information can be obtained by any program, regardless of whether the program intends to use the service already built in the system, or whether the program is to extend it by rolling its own interpretation of what the notification should look like or the way it should be delivered. In other words, future programs with more advanced notifications that are not designed to be limited by the rendering provided to them by the system will still be able to utilize test notifications to obtain information about the user's current context. Such more advanced notifications are likely to occur as the richness of notifications continues to grow and change, and new user interfaces for notifications continue to develop.

As an example, a future user interface may provide rich full screen animations that draw only when the user is not "busy." For instance, placing a CD into the CD-ROM drive might present an animation of a CD on the screen, while the CD-ROM spins up (due to technical constraints, there is a period of time from when the CD is first inserted until the CD may be read even though it is known to be in the drive—and during this time period an animation could be used to show the user that the system is aware of the CD, but just can't read from it yet). By using the test notifications of the present invention, the animation program will be able to know about the user's current context and can choose to not show on-screen if the user is not receptive to notifications right now.

As another example, a future instant messaging program may develop a new user interface for notifications that could not be done with the current notification engine. The development of such new user interfaces is needed as part of the flexibility that is required in the current competitive marketplace. In accordance with the present invention, test notifications could continue to be utilized by the instant messaging program to determine whether it should show/not show its more advanced notifications in accordance with user's current context.

In accordance with another aspect of the present invention, the test notifications can be utilized to prevent unwanted notifications from being generated. This aspect can be applied to any programs that attempt to send notifications to the system. In other words, by enabling a program to have a richer view of the user's context, unwanted notifications can be prevented from being generated by the programs, thus proactively ending the generation of these types of notifications until the user is in a receptive state. The following examples help illustrate this aspect of the invention.

As one example, a instant messaging program may provide a list of contacts. The test notifications are able to tap into the context system on a per-contact basis (e.g., "if Tom were to send you an instant message right now, would it show?" and "if Chris were to send you an instant message right now, would that show?"). On the basis of this information, the instant messaging program can begin broadcasting definite busy or free states to individual contacts. This technique could be used to preemptively stop unwanted notifications from being generated, rather than simply suppressing them once they are received.

As another example, if a user is busy, a mail program could make use of this to provide an automated reply to the sender (either to all senders based on rules that the user has provided, such as "my direct reports" or "my manager"). The automated reply could indicate "I am busy right now, but will respond when I have a chance." In general, the communications of the system as a whole can be improved by exposing the user's context to arbitrary programs.

As described above, in accordance with the present invention, an application is able to construct a test notification and receive back specifically whether or not an actual notification would draw on the screen at the present time. As noted above, this allows programs to continue to use the user context system even after new user interfaces for notifications are developed. In addition, by enabling these new richer scenarios for other programs, all programs that utilize the system can be considered to be richer and more intelligent based on having increased access to information about the user's behavior and preferences.

Figure 11:
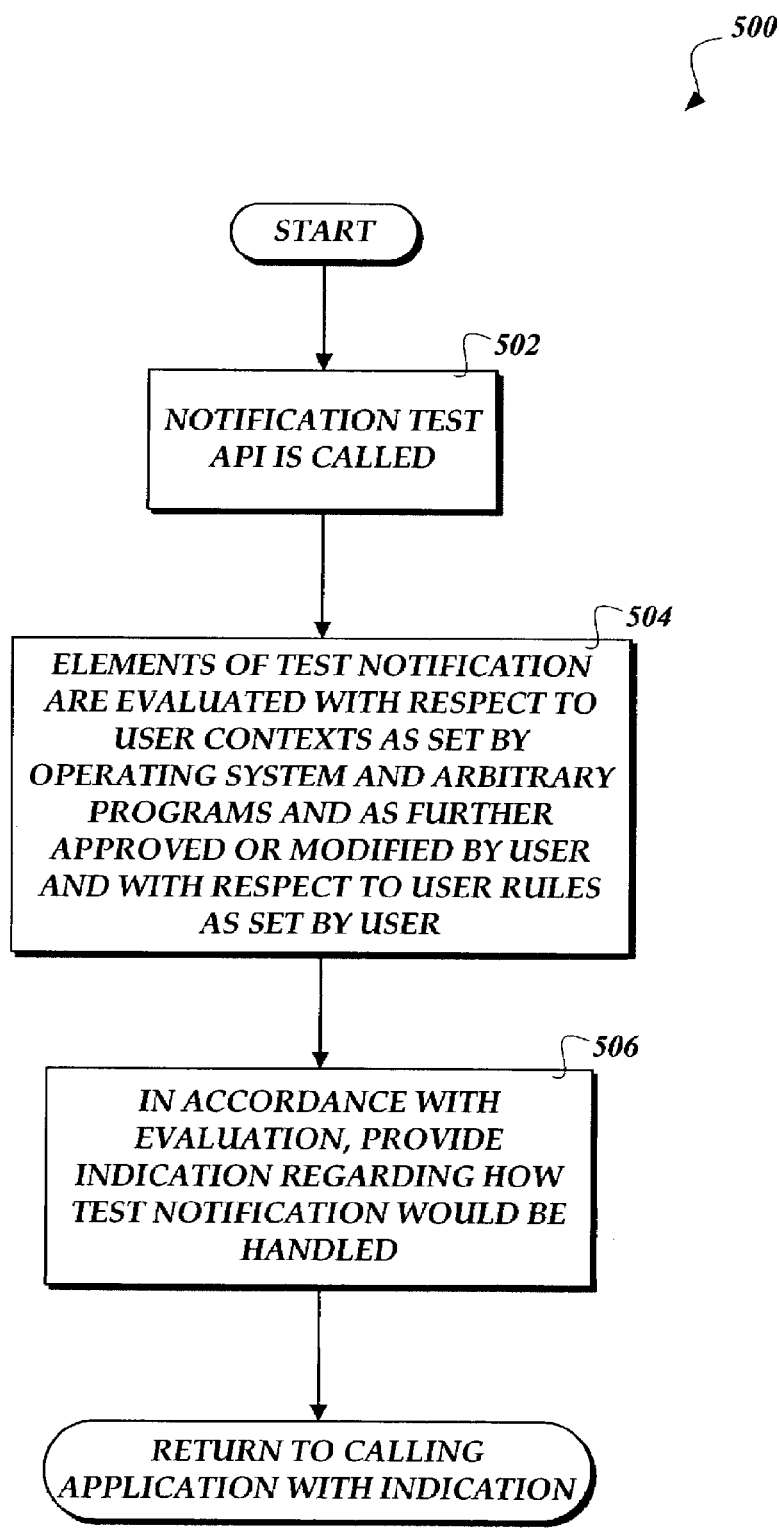
FIG. 11 is a flow diagram illustrative of a general routine for processing a test notification in accordance with the present invention.

FIG. 11 is a flow diagram illustrative of a general routine 500 for processing a test notification in accordance with the present invention. The routine is similar to the routine of FIG. 2 for processing an actual notification. As illustrated in FIG. 11, at a block 502, the notification test API is called. At a block 504, the elements of the test notification are evaluated with respect to the user contexts as set by the operating system and arbitrary programs and as further approved or modified by the user, and with respect to any user rules as set by the user. At a block 506, in accordance with the evaluation of the test notification, an indication is provided regarding how the test notification would be handled. The indication is then returned to the calling application.

In one embodiment, the notification test API is called when the operating system or an arbitrary program decides that it needs to understand how busy the user currently is. One example of when this might occur would be when there is a decision point for whether or not to draw a notification on the screen. Another example would be to use this data to inform an action that the program wants to take on the user's behalf.

When the notification test API is called, the calling program constructs a notification that is as close to what it would send if it were using the notification methods of the user context system for sending an actual notification, and then uses an optional method to test (which returns the result and also guarantees that this particular notification will not be shown on-screen). One example of this process would be a instant messaging program wanting to broadcast an appropriate free or busy state to each contact based on the current user's context. The instant messaging program would create a test notification for each contact, and based on the return value broadcast a different free or busy state on a per-contact basis. Another example would be a program wanting to show an animation based on a user context (e.g., the CD-ROM animation example described above). The code that wants to show the animation would construct a notification (in this case, the contents simply being a simple notification with an image or animation sequence as this is just a test as to whether or not the given notification would draw), and then uses the test method, and then the return results could be used as a guide for whether or not the animation should currently be played. In one embodiment, the calling code will generally at least raise the most-generic notification possible as a test notification. If there is richer data available (such as the contact from the contact list), then including this information makes the test notification more accurate as the user may have custom user rules on a per person basis that may affect the returned results.

One implementation that may be utilized for the notification test API is a polling implementation. In the instant messaging program example described above, for the polling implementation the instant messaging program would periodically re-poll the notification test API to determine how to change the broadcast data. Another implementation that can be utilized for the notification test API is a subscription callback implementation. In this implementation, the instant messaging program would "subscribe" to context changes. Then, rather than periodically re-polling, as the user context changes in ways that change what the instant messaging program would be able to broadcast, the context engine can call back to the instant messaging program with appropriate updates. In some scenarios, this is advantageous, in that there is no lag between the context changes and what is broadcast (whereas with the polling implementation, there will tend to be moments when the broadcast state does not match the current user context). For other scenarios, the polling implementation may be more appropriate (as these are responses to one-time events, e.g., a CD being inserted into a CD-ROM).

Figure 12:
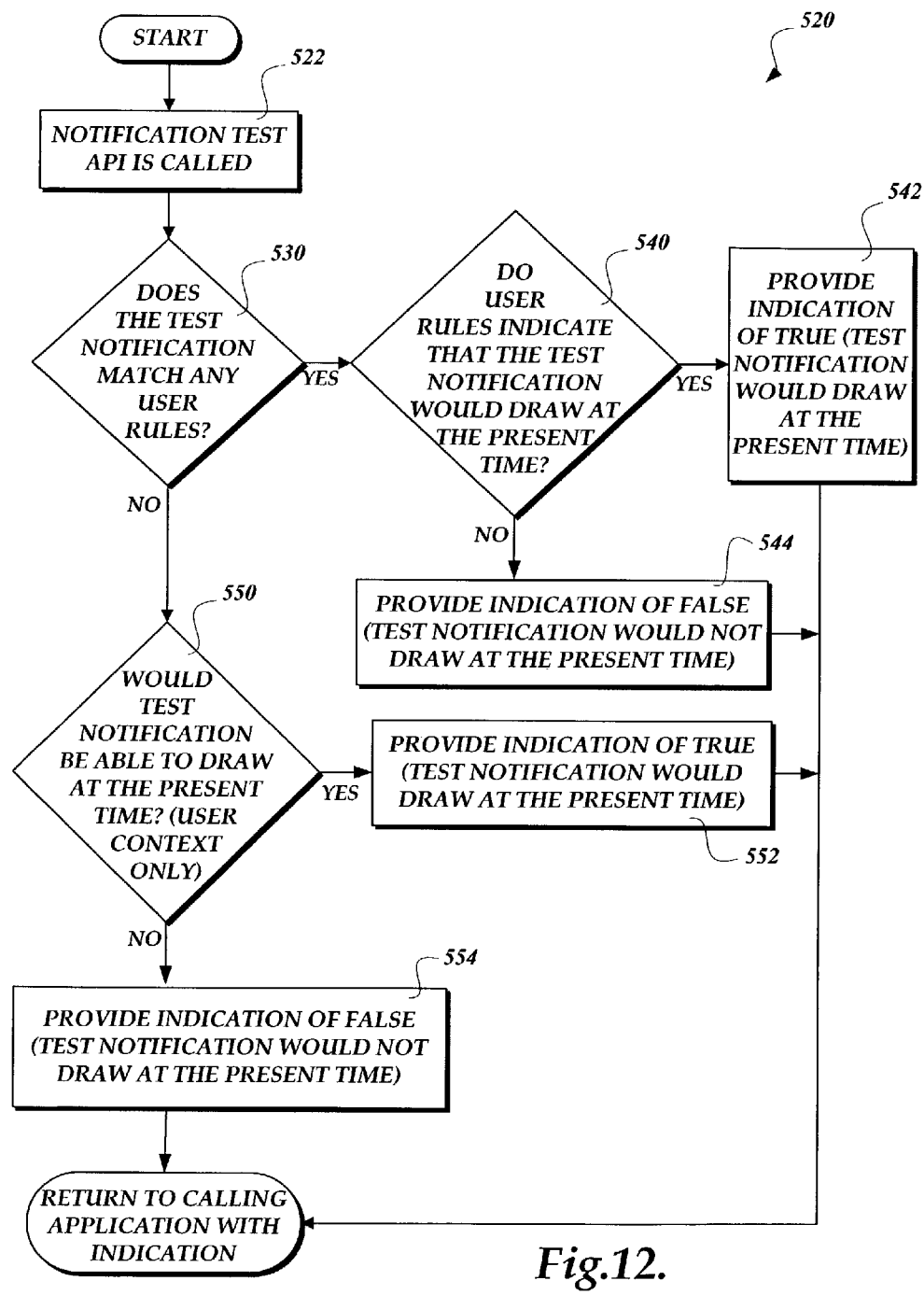
FIG. 12 is a flow diagram illustrative of a routine for processing a test notification and returning indications of true or false.

FIG. 12 is a flow diagram illustrative of a routine 520 for processing a test notification and returning an indication of true or false for whether or not the test notification would draw at the present time. At a block 522, the notification test API is called. At a decision block 530, a determination is made whether the test notification matches any user rules. If the test notification does not match any user rules, then the routine proceeds to a decision block 550, as will be described in more detail below. If the test notification does match any user rules, then the routine proceeds to a decision block 540.

At decision block 540, a determination is made whether the user rules indicate that the test notification would draw at the present time. If the test notification would draw at the present time, then the routine proceeds to a block 542, where an indication of true is provided. If the test notification would not draw at the present time, then the routine proceeds to a block 544, where an indication of false is provided.

At decision block 550, a determination is made whether the test notification would be able to draw at the present time (in relation to the user context only). If the test notification would be able to draw at the present time, then the routine proceeds to a block 552, where an indication of true is provided. If the notification would not be able to draw at the present time, then the routine proceeds to a block 554, where an indication of false is provided. From blocks 542, 544, 552 and 554, the routine returns to the calling application with the designated indication.

Figure 13:
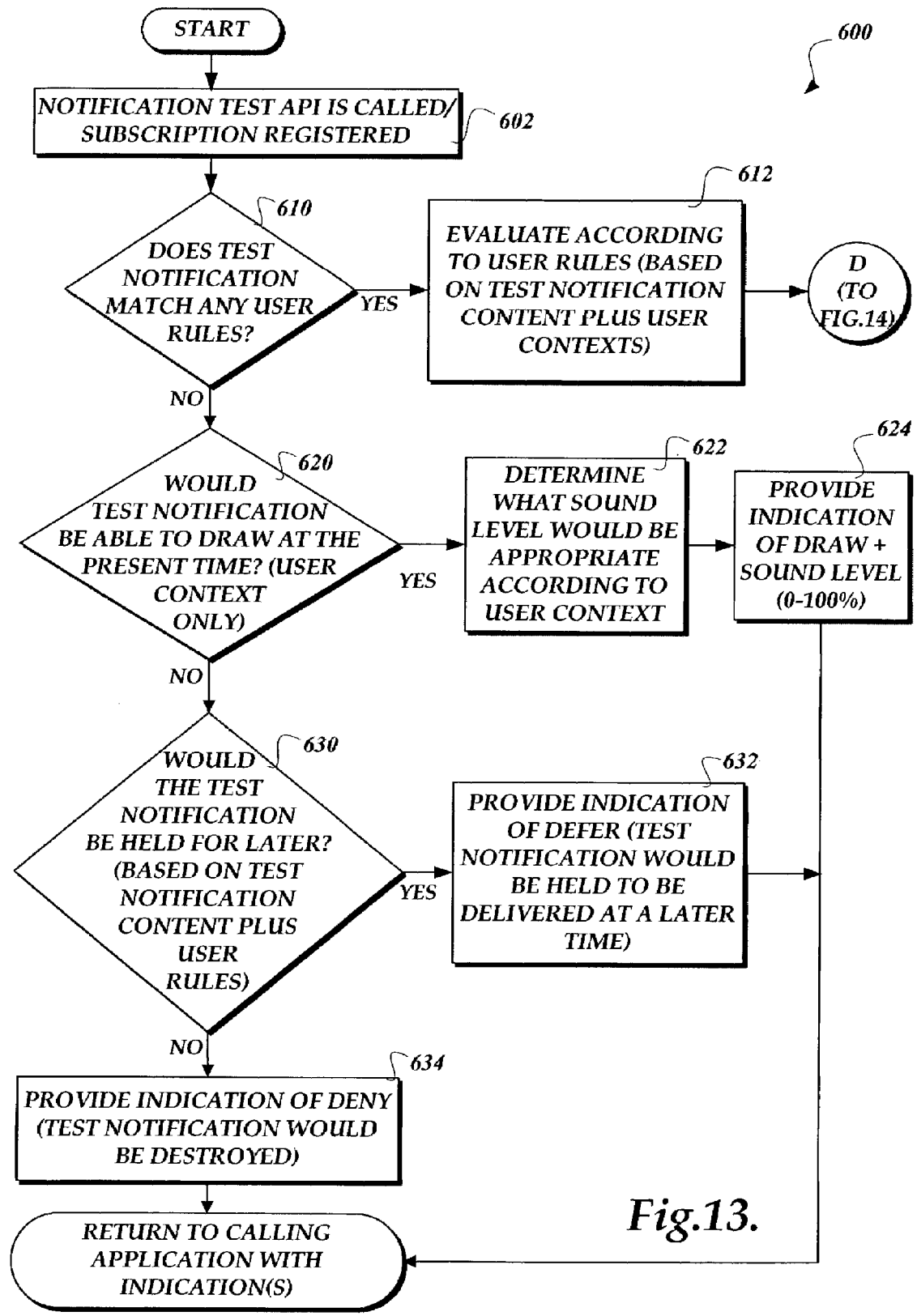
FIG. 13 is a flow diagram illustrative of a routine for processing a test notification and returning indications with full details.

FIG. 13 is a flow diagram illustrative of a routine 600 for processing a notification and returning detailed indications. As noted above, the routine 520 of FIG. 12 only provides a return value with an indication of true or false, with regard to whether or not the notification would draw at the present time. As will be described in more detail below, the routine 600 of FIG. 13 returns richer return values (e.g., the notification would not draw right now, but it would draw as soon as the user's context changes, or it would route to another device, etc.). This provides for richer logic in the calling code. This allows for advanced functionality in programs that are able to utilize such richer return values.

It should also be noted while the return values are being described as part of a function call, in another embodiment this data may be passed as part of a callback. In other words, the calling application can set up a "subscription" to a notification such that when a user's context subsequently changes (as would affect the delivery of notifications from the calling application) then the calling application is notified. This requires no polling, and in some cases is thus better for the robustness and performance of the system.

As illustrated in FIG. 13, at a block 602 the notification test API is called or a subscription is registered (as related to the polling versus subscription embodiments described above). At a decision block 610, a determination is made whether the test notification matches any user rules. If the test notification does not match any user rules, then the routine proceeds to a decision block 620, as will be described in more detail below. If the test notification does match any user rules, then the routine proceeds to a block 612. At block 612, the test notification is evaluated according to the user rules (based on the test notification content plus the user contexts), and the routine continues to a point D that is continued in FIG. 14, as will be described in more detail below.

At decision block 620, a determination is made whether the test notification would be able to draw at the present time (based on user context only). If the test notification would not be able to draw at the present time, then the routine proceeds to a decision block 630, as will be described in more detail below. If the test notification would be able to draw at the present time, then the routine proceeds to a block 622. At block 622, the routine determines what sound level would be appropriate according to the user context. At a block 624, an indication is provided that the notification would draw, and also including the percentage sound level that would be appropriate for the notification.

At decision block 630, the determination is made whether the test notification would be held for later delivery (based on the test notification content plus the user rules). If the test notification would be held for later, then the routine proceeds to a block 632 where an indication is provided of defer. If the test notification would not be held for later delivery, then the routine proceeds to a block 634, where an indication is provided of deny. From blocks 624, 632 and 634, the routine returns to the calling application with the specified indication(s).

Figure 14:
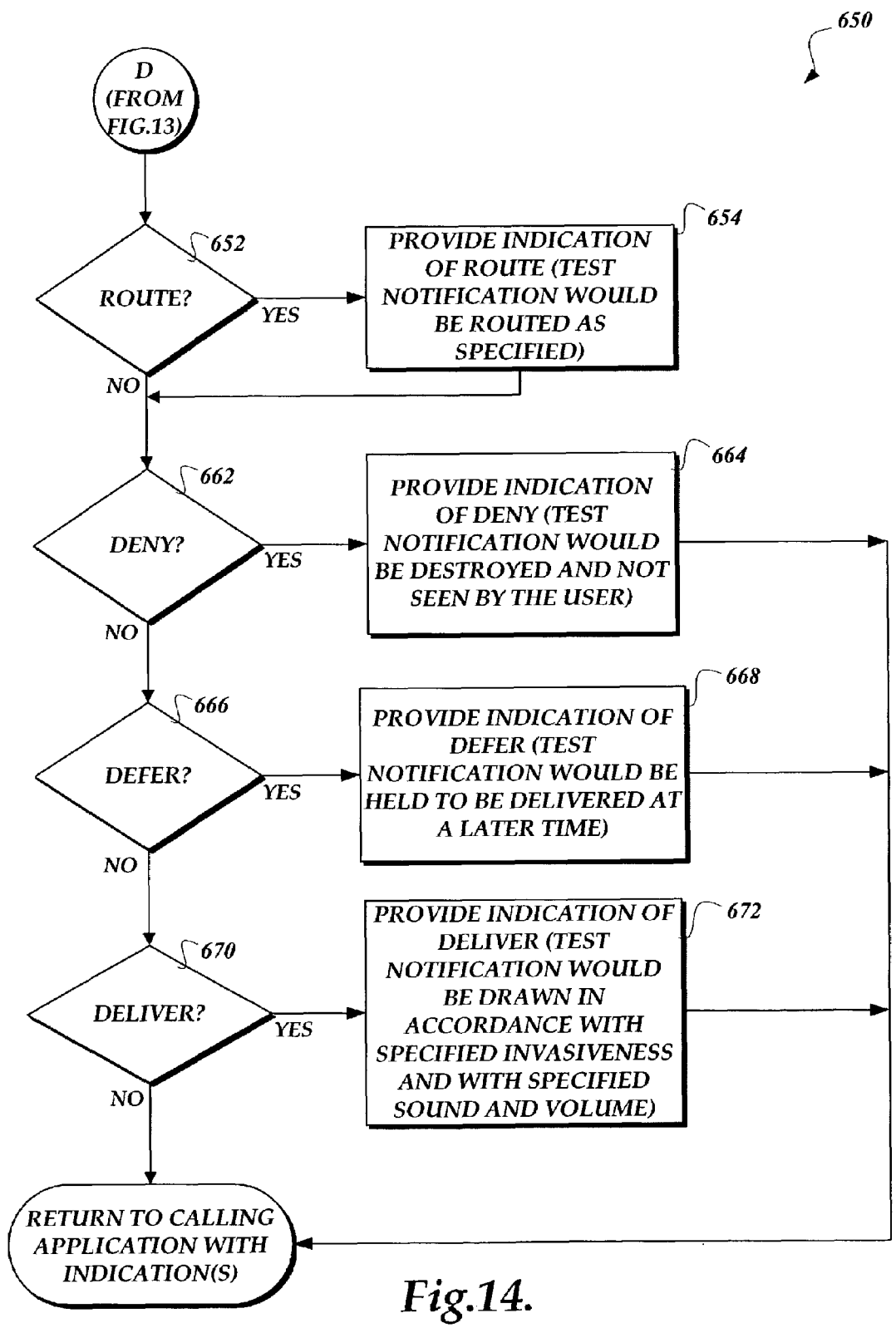
FIG. 14 is a flow diagram illustrative of a routine for utilizing user rules to process a test notification based on the test notification's content and the current user contexts.

FIG. 14 is a flow diagram illustrative of a routine 650 for evaluating a test notification in accordance with user rules. The routine continues from a point D from FIG. 13. As illustrated in FIG. 14, at a decision block 652, a determination is made whether the test notification should be routed. If the test notification is to be routed, then the routine proceeds to a block 654 where an indication of route is provided, and the routine proceeds to a decision block 662. If the test notification would not be routed, the routine also proceeds to decision block 662.

At decision block 662, a determination is made whether the test notification would be denied. If the test notification would be denied, then the routine proceeds to a block 664, where an indication of deny is provided. If the test notification would not be denied, then the routine proceeds to a decision block 666.

At decision block 666, a determination is made whether the test notification would be deferred. If the test notification would be deferred, then the routine proceeds to a block 668, where an indication is provided of defer. If the test notification would not be deferred, then the routine proceeds to a decision block 670.

At decision block 670, a determination is made whether the test notification would be delivered. If the test notification would be delivered, then the routine proceeds to a block 672, where an indication of deliver is provided. In one embodiment, the delivery indication may also include a specified invasiveness indication as well as a sound and volume indication. If the test notification would not be delivered, then the routine returns to the calling application. From blocks 664, 668, and 672, the routine returns to the calling application with the specified indications.

It will be appreciated that the present invention as described above with respect to FIGS. 1-14 provides a system and method utilizing test notifications which enable programs to obtain indications as to the availability of a user. By enabling a program to have a richer view of a user's context, the generation of unwanted notifications can be prevented at the source, thus allowing notifications to only be generated when a user is in a receptive state. In addition, a program is able to utilize the test notifications to determine a user's context, even if the program generally utilizes a different user interface for its own notifications. These aspects allow for greater flexibility in the potential uses of the user context system. These aspects also enable new richer scenarios for other programs, such that the system as a whole can become richer and more intelligent based on the user's behavior and preferences.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer-implemented method for utilizing test notifications, the method comprising:
   receiving a test notification, the test notification comprising elements that correspond an actual notification for potential output outputting to a user on a computer, the test notification for determining how the actual notification would be output by the user's computer given a current context of the computer and pre-determined user-defined rules without outputting the actual notification, wherein the actual notification is a form of a signal from a program that indicates to the user that a specified event has occurred and wherein the elements comprise at least one of text, audio, and graphics;
   based on a comparison of the elements of the test notification to the current context of the computer and pre-determined rules, determining how the test notification would be handled if the test notification were an actual notification; and
   returning an indication of how the test notification would be handled if the test notification were an actual notification, wherein the indication specifies:
   (1) whether the test notification would be delivered, denied, or deferred; and
   (2) whether modifications should be made to the elements;
   one or more of polling additional test notifications, such that the additional test notifications are utilized to determine when specified changes to the context of the computer have occurred, and
   subscribing to changes to the context, such that indications are provided when changes to the context have occurred.

2. The method of claim 1, wherein the test notification simulates an actual notification and the results of the simulation indicate whether the actual notification would have been delivered to the user of the application program.

3. The method of claim 1, wherein evaluating the test notification is done according to a user context.

4. The method of claim 3, wherein the user context comprises a condition that is true or false and an instruction that is to be executed if the condition is true.

5. The method of claim 4, wherein a condition of the user context is user notification availability, and the instruction is whether or not an actual notification should be delivered to the user of the application program.

6. The method of claim 1, wherein evaluating the test notification is done according to a user rule that dictates how a test notification that contains certain specified content is to be handled.

7. The method of claim 1 further comprising polling additional test notifications such that the additional test notifications are utilized to determine when specified changes to a user context have occurred.

8. The method of claim 1 further comprising subscribing changes to a user context indications to provide when changes to a user context have occurred.

9. The method of claim 1, wherein the indication to the application program as to the results of evaluating the test notification comprises a delivery indication.

10. The method of claim 9, wherein the delivery indication is either true or false.

11. The method of claim 9, wherein the indication to the application program as to the results of evaluating the test notification further comprises one of a routing or deferring indication.

12. The method of claim 9, wherein the indication to the application program as to the results of evaluating the test notification further comprises an invasiveness indication.

13. The method of claim 9, wherein the indication to the application program as to the results of evaluating the test notification further comprises a volume indication.

14. A computer-readable storage medium having computer-executable components for utilizing test notifications comprising a component configured to:
   receive a test notification, the test notification comprising elements that correspond to an actual notification for potential output outputting to a user on a computer, the test notification for determining how the actual notification would be output by the user's computer given a current context of the computer and pre-determined user-defined rules without outputting the actual notification, wherein the actual notification is a form of a signal from a program that indicates to the user that a specified event has occurred and wherein the elements comprise at least one of text, audio, and graphics;
   based on a comparison of the elements of the test notification to the current context of the computer and pre-determined rules, determine how the test notification would be handled if the test notification were an actual notification; and
   return an indication of how the test notification would be handled if the test notification were an actual notification; and at least one of poll additional test notifications, such that the additional test notifications are utilized to determine when specified changes to the context of the computer have occurred, and automatically provide indications when changes to the context of the computer have occurred, wherein the indication specifies:
   (1) whether the test notification would be delivered, denied, or deferred; and
   (2) whether modifications should be made to the elements;
   one or more of polling additional test notifications, such that the additional test notifications are utilized to determine when specified changes to the context of the computer have occurred, and
   subscribing to changes to the context, such that indications are provided when changes to the context have occurred.

15. The computer-readable storage medium of claim 14, wherein the test notification simulates an actual notification and the results of the evaluation of the test notification indicate whether the test notification would have been delivered to the user of the application program if the test notification were an actual notification.

16. The computer-readable storage medium of claim 14, wherein evaluating the test notification is done according to a user context that comprises a condition and an instruction that is to be executed depending on the condition.

17. The computer-readable storage medium of claim 16, wherein the condition is true or false and the instruction is to be executed if the condition is true.

18. The computer-readable storage medium of claim 17, wherein the condition of the user context is user notification availability, and the instruction is whether or not all actual notification should be delivered to the user of the application program.

19. The computer-readable storage medium of claim 14, wherein evaluating the test notification is done according to a user rule that dictates how a test notification that contains certain specified content is to be handled.

20. The computer-readable storage medium of claim 14 further comprising a component for polling additional test notifications such that the additional test notifications are utilized to determine when specified changes to a user context have occurred.

21. The computer-readable storage medium of claim 14 further comprising automatically providing indications to the application program when changes to a user context have occurred.

22. The computer-readable storage medium of claim 14, wherein the indication to the application program as to the results of evaluating the test notification comprises at least one of a delivery indication, a routing indication, or a deferring indication.

23. A computer-readable storage medium having computer-executable components for utilizing test notifications, the components configured to:
   construct a test notification, the test notification comprising elements that correspond to an actual notification for potential output outputting to a user on a computer, the test notification for determining how the actual notification would be output by the user's computer given a current context of the computer and pre-determined user-defined rules without outputting the actual notification, wherein the test notification is constructed by a calling program and wherein the elements comprise at least one of text, audio, and graphics;
   receive a test notification from the calling program, wherein the test notification is received by a notification interface;
   based on a comparison of the elements of the test notification to the current context and pre-determined rules, determine how the test notification would be handled if it were an actual notification delivered with said elements to the computer under the context and rules;
   provide an indication to the calling program as to how the test notification would be handled if it were an actual notification delivered with said elements to the computer under the context and rules, wherein the indication specifies:
      (1) whether the test notification would be delivered, denied, or deferred; and
      (2) whether modifications should be made to the elements;
   poll additional test notifications, wherein the additional test notifications are utilized by the calling program to re-poll the computer to determine when specified changes to contexts and rules have occurred; and
   subscribe to changes to context and rules to provide indications to the calling program when changes to user contexts and rules have occurred.

24. The method of claim 23, wherein the test notification was received from a calling application, and the indication as to whether the actual notification would have been delivered is returned to the calling application.

25. A computer-implemented method for utilizing test notifications, the method comprising:
   receiving a test notification, the test notification comprising elements that correspond to an actual notification for potential output outputting to a user on a computer, the test notification for determining how the actual notification would be output by the user's computer given a current context of the computer and pre-determined user-defined rules without outputting the actual notification, wherein the test notification is constructed by a calling program and wherein the elements comprise at least one of text, audio, and graphics;
   based on a comparison of the elements of the test notification to the current context of the computer and pre-determined rules, determining how the test notification would be handled if the test notification were an actual notification;
   returning an indication to the calling program of how the test notification would be handled if the test notification were an actual notification, wherein the indication is returned by the test notification interface and wherein the calling program creates an actual notification for output to a user based on the indication, wherein the indication specifies:
      (1) whether the test notification would be delivered, denied, or deferred; and
      (2) whether modifications should be made to the elements;
   one or more of polling additional test notifications, such that the additional test notifications are utilized to determine when specified changes to contexts have occurred, and subscribing to changes to contexts, such that indications are automatically provided when changes to contexts have occurred.

26. The method of claim 25, wherein evaluating the test notification is done according to a user context.

27. The method of claim 26, wherein the user context comprises a condition that is true or false and an instruction that is to be executed if the condition is true.

28. The method of claim 25, wherein evaluating the test notification is done according to a user rule that dictates how an actual notification that contains certain specified content is to be handled.

29. The method of claim 25 further comprising a component for polling additional test notifications such that the additional test notifications are utilized to determine when specified changes to a user context have occurred.

30. The method of claim 25 further comprising a component for subscribing changes to a user context such that the computer-readable medium automatically provides indications to the application program when changes to a user context have occurred.

31. The method of claim 25, wherein the indication to the application program as to whether the actual notification would have been delivered to the user of the application program further comprises additional indications as to how the actual notification would have been handled.

32. A system, comprising:
   one or more processors;
   a memory accessible by the processors;
   one or more volatile and nonvolatile storage devices accessible by the processors;
   a notification tool for providing notifications, the notification tool including:
   means for receiving a test notification request corresponding to an actual notification for a user on a computer, wherein the test notification comprising elements that correspond to an actual notification for potential output outputting to a user on a computer, the test notification for determining how the actual notification would be output by the user's computer given a current context of the computer and pre-determined user-defined rules without outputting the actual notification, wherein the test notification is constructed by a calling program and wherein the elements comprise at least one of text, audio, and graphics;

means for determining if the actual notification is consistent with the user's current context on the computer such that the actual notification can be delivered to the user; and means for returning an indication that the corresponding actual notification is consistent with the user's current context such that the actual notification may be output to the user's computer at the current time, wherein the indication specifies:
  (1) whether the test notification would be delivered, denied, or deferred; and
  (2) whether modifications should be made to the elements;

means for polling additional test notifications, such that the additional test notifications are utilized to determine when specified changes to the context of the computer have occurred, and means for subscribing to changes to the context, such that indications are provided when changes to the context have occurred.

33. The system of claim 32, wherein the notification tool further includes means for evaluating the test notification according to a user context.

34. The system of claim 32, wherein the notification tool further includes means for evaluating the test notification according to a user rule.

35. The system of claim 32, wherein the notification tool further includes means for polling additional test notifications wherein the additional test notifications are utilized to re-poll the system to determine when specified changes have occurred.

36. The system of claim 32, wherein the notification tool further includes means for subscribing changes to a user context wherein the system automatically provides indications to the application program when changes to a user context have occurred.

37. A system, comprising:
one or more processors;
a memory accessible by the processors;
one or more volatile and nonvolatile storage devices accessible by the processors;
a notification tool for providing notifications, the notification tool including:
means for receiving a request for user notification availability based upon test notification that simulates actual notification from a test notification interface called by an application program wherein the test notification comprising elements that correspond to an actual notification for potential output outputting to a user on a computer, the test notification for determining how the actual notification would be output by the user's computer given a current context of the computer and pre-determined user-defined rules without outputting the actual notification, wherein the test notification is constructed by a calling program and wherein the elements comprise at least one of text, audio, and graphics; and means for evaluating the test notification and providing an indication to the application program as to whether the actual notification would have been delivered to a user of the application program, wherein the indication specifies:
  (1) whether the test notification would be delivered, denied, or deferred; and
  (2) whether modifications should be made to the elements;

means for polling additional test notifications, such that the additional test notifications are utilized to determine when specified changes to the context of the computer have occurred, and means for subscribing to changes to the context, such that indications are provided when changes to the context have occurred.

38. The system of claim 37, wherein the notification tool further includes means for evaluating the test notification according to a user context.

39. The system of claim 37, wherein the notification tool further includes means for evaluating the test notification according to a user rule.

40. The system of claim 37, wherein the notification tool further includes means for polling additional test notifications wherein the additional test notifications are utilized to re-poll the system to determine when specified changes have occurred.

41. The system of claim 37, wherein the notification tool further includes means for subscribing changes to a user context wherein the system automatically provides indications to the application program when changes to a user context have occurred.

* * * * *

UNITED STATES PATENT AND TRADEMARK OFFICE
CERTIFICATE OF CORRECTION

| | | |
|---|---|---|
| PATENT NO. | : 7,469,272 B2 | Page 1 of 1 |
| APPLICATION NO. | : 10/402179 | |
| DATED | : December 23, 2008 | |
| INVENTOR(S) | : Timothy P. McKee et al. | |

It is certified that error appears in the above-identified patent and that said Letters Patent is hereby corrected as shown below:

In column 19, line 10, in Claim 1, after "correspond" insert -- to --.

Signed and Sealed this
Third Day of May, 2011

David J. Kappos
*Director of the United States Patent and Trademark Office*